United States Patent
Atarashi et al.

(10) Patent No.: US 7,100,721 B2
(45) Date of Patent: Sep. 5, 2006

(54) HYBRID VEHICLE DRIVE CONTROL APPARATUS, HYBRID VEHICLE DRIVE CONTROL METHOD, AND PROGRAM THEREOF

(75) Inventors: Tomoo Atarashi, Anjo (JP); Masaki Nomura, Anjo (JP); Kazuyuki Izawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 238 days.

(21) Appl. No.: 10/633,722

(22) Filed: Aug. 5, 2003

(65) Prior Publication Data

US 2004/0055799 A1    Mar. 25, 2004

(30) Foreign Application Priority Data

Aug. 9, 2002    (JP)    ............................. 2002-234017

(51) Int. Cl.
*B60K 1/00*    (2006.01)
(52) U.S. Cl. .................. 180/65.2; 180/65.8; 701/22
(58) Field of Classification Search ............. None
See application file for complete search history.

(56) References Cited

U.S. PATENT DOCUMENTS

| | | | | |
|---|---|---|---|---|
| 5,430,362 A | * | 7/1995 | Carr et al. | 318/779 |
| 5,823,281 A | * | 10/1998 | Yamaguchi et al. | 180/65.2 |
| 5,841,201 A | * | 11/1998 | Tabata et al. | 290/40 C |
| 5,944,630 A | * | 8/1999 | Omote | 477/5 |
| 6,054,776 A | * | 4/2000 | Sumi | 290/17 |
| 6,251,037 B1 | * | 6/2001 | Baumgaertner et al. | 475/2 |
| 2002/0079148 A1 | * | 6/2002 | Aoki et al. | |

FOREIGN PATENT DOCUMENTS

JP    A 9-156387    6/1997

* cited by examiner

*Primary Examiner*—Christopher P. Ellis
*Assistant Examiner*—Christopher Bottorff
(74) *Attorney, Agent, or Firm*—Oliff & Berridge, PLC

(57) ABSTRACT

A hybrid vehicle drive control apparatus including an electric generator mechanically connected to an engine so as to have a differential rotation with respect to the engine, a generator brake for mechanically stopping a rotation of the generator and a controller that gradually decreases a generator torque while engaging the generator brake.

5 Claims, 20 Drawing Sheets

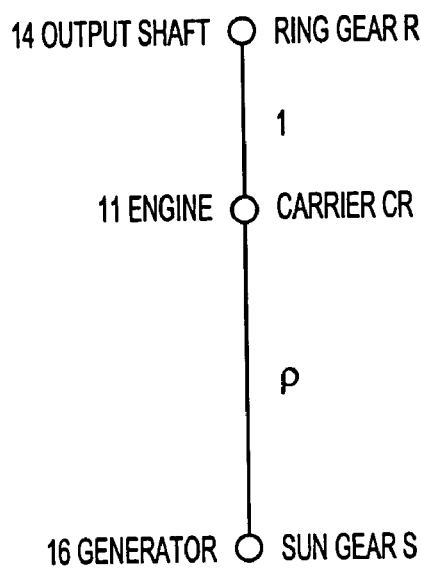
Fig. 4
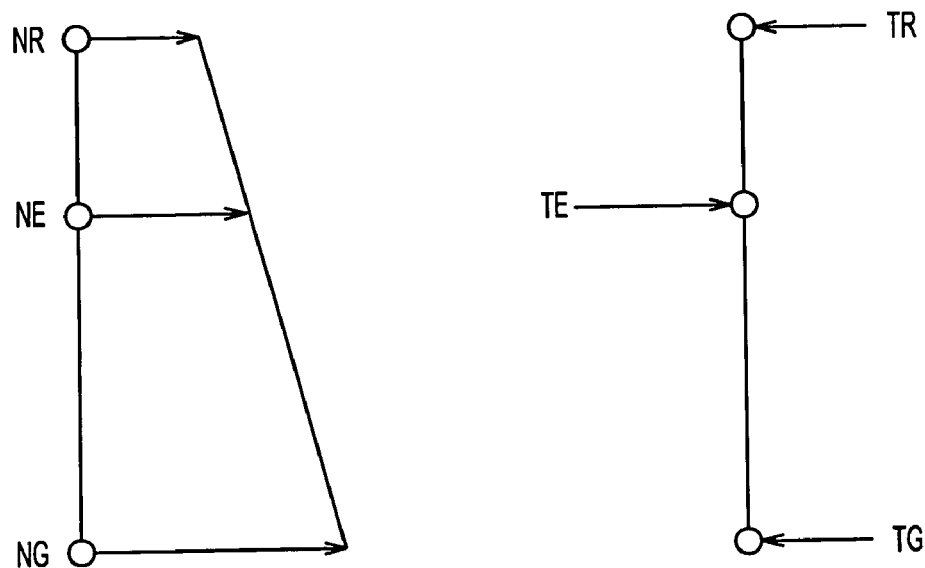
Fig. 5
Fig. 6

HYBRID VEHICLE DRIVE CONTROL APPARATUS, HYBRID VEHICLE DRIVE CONTROL METHOD, AND PROGRAM THEREOF

INCORPORATION BY REFERENCE

The disclosure of Japanese Patent Application No. 2002-234017 filed on Aug. 9, 2002 including the specification, drawings and abstract are incorporated herein by reference in its entirety.

BACKGROUND OF THE INVENTION

1. Field of Invention

The invention relates to a hybrid vehicle drive control apparatus and a hybrid vehicle drive control method as well as a program thereof.

2. Description of Related Art

A known vehicle drive apparatus installed in a hybrid vehicle for transferring a torque of an internal combustion engine, that is a portion of the engine torque, to an electric generator (generator-motor) and transferring the rest of the engine torque to driving wheels is provided with a planetary gear unit that includes a sun gear, a ring gear and a carrier. The carrier is connected to the engine. The ring gear is connected to the driving wheels and to a vehicle drive electric motor. The sun gear is connected to the generator. Rotation output from the ring gear and the vehicle drive electric motor is transferred to the driving wheels, thus generating a vehicle-driving force.

If, in this kind of vehicle drive apparatus, the rotation speed of the generator (i.e., generator rotation speed) is relatively low, the electric power consumption increases and the electric power generation efficiency of the generator decreases. As such, the fuel economy of the hybrid vehicle correspondingly degrades. Therefore, if the generator rotation speed is relatively low, a generator brake is engaged in order to stop the generator (shut down) (Japanese Patent Application Laid-open No. 9-156387).

To that end, a generator control device of the vehicle drive apparatus executes a generator rotation speed control in order to set a target generator rotation speed, that is a target value of a generator rotation speed, at zero (0). The control also causes the generator to receive the engine torque and then engage the generator brake. Subsequently, the generator control device instantaneously changes the torque of the generator, that is the generator torque, to zero to stop the generator.

SUMMARY OF THE INVENTION

In the above-described conventional vehicle drive apparatus, however, when the generator brake is engaged for the purpose of stopping the generator, the generator torque is instantaneously changed to zero, so that the engine torque may instantaneously act on the generator brake. Therefore, the backlashes of component parts of the generator brake, such as thin plates and the like, are filled in or eliminated in a very short time so that abnormal noise, such as rattling noise and the like, is produced and, furthermore, the service life of the generator brake also reduces.

FIG. 2 is a time chart of the generator torque and the generator rotation speed of a conventional vehicle drive apparatus. In FIG. 2, LG1 denotes a line that indicates the generator torque TG, and LG2 denotes a line that indicates the generator rotation speed NG. After the generator brake is engaged, the generator is suddenly stopped (shut down) at a timing t1. Therefore, the generator torque TG instantaneously becomes zero and the generator rotation speed NG instantaneously increases. Therefore, the backlashes of component parts of the generator brake, such as thin plates and the like, are filled in or eliminated, so that abnormal noise, such as rattling noise and the like, is produced. Furthermore, the service life of the generator brake also reduces.

The invention thus provides a hybrid vehicle drive control apparatus, a hybrid vehicle drive control method and a computer program thereof which solve the aforementioned problems of the conventional vehicle drive apparatuses and which prevent the production of abnormal noises when the generator brake is engaged to stop the generator, and therefore increase the durability of the generator brake.

A hybrid vehicle drive control apparatus according to a first exemplary aspect of the invention includes an electric generator mechanically connected to an engine so as to have differential rotation with respect to the engine, a generator brake for mechanically stopping a rotation of the generator, and a controller that gradually decreases a generator torque while engaging the generator brake.

In this structure, the generator torque is gradually decreased as the generator brake is engaged. Therefore, the generator rotation speed can be substantially prevented from unnecessarily increasing before the backlashes of component parts of the generator brake, such as thin plates and the like, are filled in or eliminated. Hence, the production of an abnormal noise, such as rattling noise or the like, can be prevented. Thus, the service life of the generator brake will be increased.

According to a second exemplary aspect of the invention, a method of operating a hybrid vehicle includes the steps of engaging a generator brake, mechanically stopping rotation of a generator that is mechanically connected to an engine so as to have a differential rotation with respect to the engine, via the generator brake and gradually decreasing a generator torque concurrently with the mechanically stopping.

A program, according to a third exemplary aspect of the invention, for a hybrid vehicle that has an electric generator mechanically connected to an engine so as to have a differential rotation with respect to the engine and a generator brake for mechanically stopping a rotation of the generator includes a routine that gradually decreases a generator torque while engaging the generator brake.

The program causes a computer to function as a generator brake engagement control unit that gradually decreases a generator torque while engaging the generator brake.

BRIEF DESCRIPTION OF THE DRAWINGS

Various embodiments of the invention will be described with reference to the drawings, wherein:

FIG. 4 is a diagram illustrating an operation of a planetary gear unit in accordance with an embodiment of the invention;

FIG. 5 is a vehicle speed diagram for an ordinary run in accordance with an embodiment of the invention;

FIG. 6 is a torque diagram for an ordinary run in accordance with the embodiment of the invention;

DETAILED DESCRIPTION OF PREFERRED EMBODIMENTS

Figure 1:
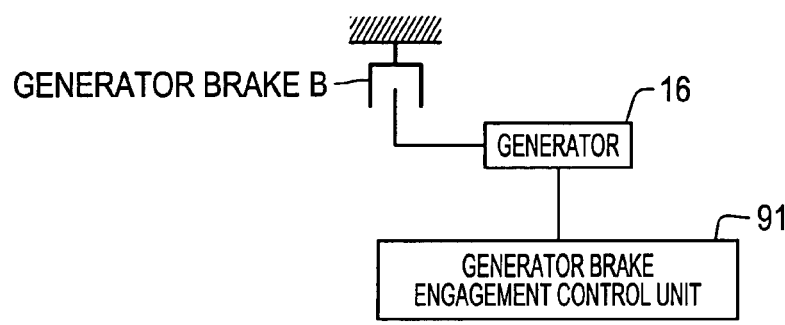
FIG. 1 is a function block diagram of a hybrid vehicle drive control apparatus in accordance with an embodiment of the invention.
Figure 2:
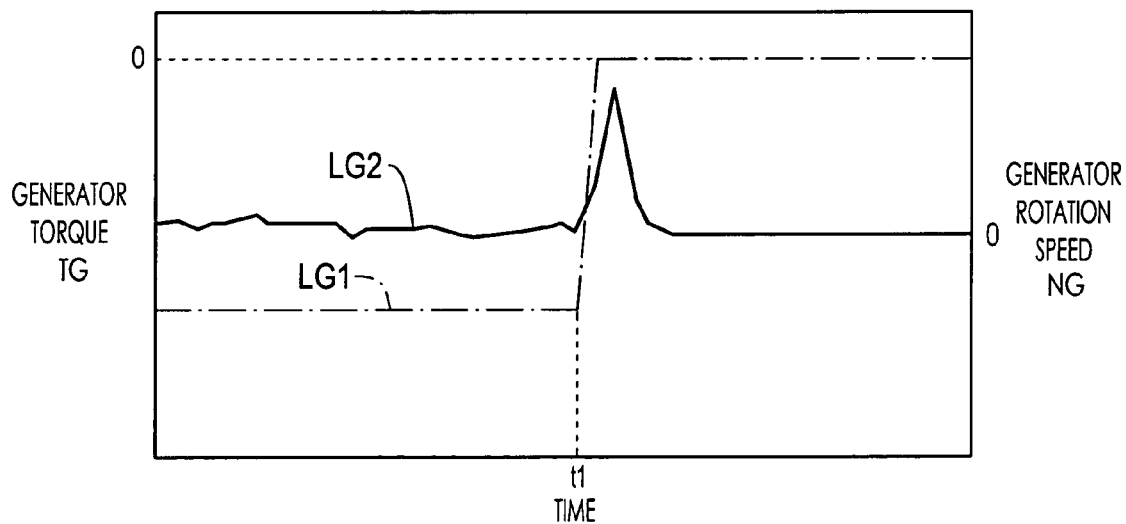
FIG. 2 is a time chart indicating the generator torque and the generator rotation speed of a conventional vehicle drive apparatus.

Preferred embodiments of the invention will be described in detail hereinafter with reference to the accompanying drawings. FIG. 1 is a function block diagram of a hybrid vehicle drive control apparatus in accordance with an embodiment of the invention.

In FIG. 1, reference numeral 16 denotes an electric generator that is mechanically connected to an engine (not shown) for differential rotation with respect to the engine, and B denotes a generator brake for mechanically stopping rotation of the generator 16, and 91 denotes a generator brake engagement control unit that gradually decreases the torque of the generator 16 while engaging the generator brake B.

Figure 3:
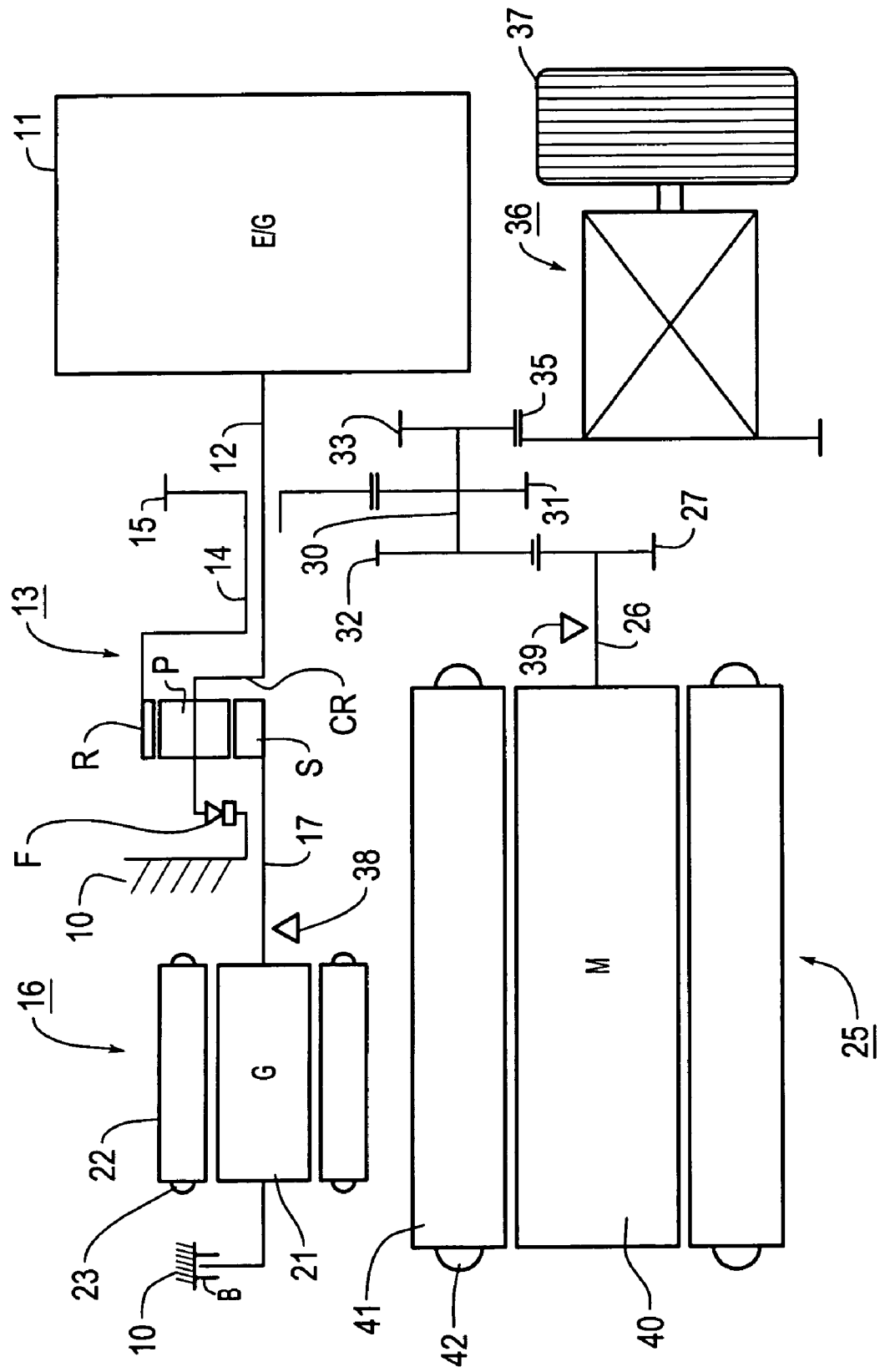
FIG. 3 is a conceptual diagram of a hybrid vehicle in accordance with an embodiment of the invention.

FIG. 3 is a conceptual diagram of a hybrid vehicle in accordance with an embodiment of the invention. In FIG. 3, reference numeral 11 denotes an internal combustion engine (E/G) provided as a drive power machine on a first axis; 12 denotes an output shaft that outputs rotation produced by driving the engine 11; 13 denotes a planetary gear unit as a differential gear device for changing the speed of rotation input via the output shaft 12; 14 denotes an output shaft disposed on the first axis for outputting the speed-shifted rotation of the planetary gear unit 13; 15 denotes a first counter drive gear as an output gear fixed to the output shaft 14; 16 denotes an electric generator (G) as a first electric motor device that is disposed on the first axis, and that is connected to the planetary gear unit 13 via a transfer shaft 17, and that is mechanically connected to the engine 11 so that the generator 16 is allowed to have a differential rotation with respect to the engine 11. The output shaft 14 has a sleeve configuration, and is disposed surrounding the output shaft 12. The first counter drive gear 15 is disposed at a side of the planetary gear unit 13 that is closer to the engine 11.

The planetary gear unit 13 has at least a sun gear S as a first gear element, pinions P meshing with the sun gear S, a ring gear R as a second gear element meshing with the pinions P, and a carrier CR as a third gear element that rotatably supports the pinions P. The sun gear S is connected to the generator 16 via the transfer shaft 17. The ring gear R is connected, via the output shaft 14 and a certain gear train, to driving wheels 37 and a vehicle drive motor (M) 25 as a second electric motor device that is disposed on a second axis parallel to the first axis and that is mechanically connected to the engine 11 and the generator 16 so as to have differential rotations with respect to the engine 11 and the generator 16. The carrier CR is connected to the engine 11 via the output shaft 12. The vehicle drive motor 25 and the drive wheels 37 are mechanically interconnected. Furthermore, a one-way clutch F is disposed between the carrier CR and a case 10 of a hybrid vehicle drive apparatus. The one-way clutch F becomes free when forward rotation is transferred from the engine 11 to the carrier CR. When reverse rotation is transferred to the carrier CR from the generator 16 or the vehicle drive motor 25, the one-way clutch F is locked to prevent transfer of reverse rotation to the engine 11.

The generator 16 is substantially made up of a rotor 21 that is fixed to the transfer shaft 17 and is rotatably disposed, a stator 22 disposed around the rotor 21, and coils 23 wound on the stator 22. The generator 16 generates electric power from rotation transferred thereto via the transfer shaft 17. The coils 23 are connected to a battery (not shown), and supply direct current to the battery. The generator brake B is disposed between the rotor 21 and the case 10. By engaging the generator brake B, the rotor 21 can be fixed to mechanically stop rotation of the generator 16. To that end, the generator brake B has a plurality of thin plates (not shown) on the driving and driven sides, a hydraulic servo, etc. By supplying oil pressure to the hydraulic servo, the individual thin plates are pressed against one another, so that the generator brake B is engaged by a friction force.

In FIG. 3, reference numeral 26 denotes an output shaft disposed on the second axis for outputting rotation of the vehicle drive motor 25, and 27 denotes a second counter drive gear as an output gear fixed to the output shaft 26. The vehicle drive motor 25 is substantially made up of a rotor 40 that is fixed to the output shaft 26 and is rotatably disposed, a stator 41 disposed around the rotor 40, and coils 42 wound on the stator 41.

The vehicle drive motor 25 generates torque that is, the drive motor torque TM, from U-phase, V-phase and W-phase alternating currents supplied to the coils 42. To that end, the coils 42 are connected to the battery, and are supplied with the three-phase currents converted from the direct current from the battery.

In order to rotate the drive wheels 37 in the same direction as the engine 11 rotates, a counter shaft 30 is disposed on a third axis that is parallel to the first and second axes. Fixed to the counter shaft 30 are a first counter driven gear 31 and a second counter driven gear 32 having more teeth than the first counter driven gear 31. The first counter driven gear 31 and the first counter drive gear 15 are meshed with each other and the second counter driven gear 32 and the second counter drive gear 27 are meshed with each other. Therefore, rotation of the first counter drive gear 15 is transferred to the first counter driven gear 31 as reversed-direction rotation, and rotation of the second counter drive gear 27 is transferred to the second counter driven gear 32 as reversed-direction rotation. Furthermore, a differential pinion gear 33 having fewer teeth than the first counter driven gear 31 is fixed to the counter shaft 30.

A differential device 36 is disposed on a fourth axis parallel to the first to third axes. A differential ring gear 35 of the differential device 36 is meshed with the differential pinion gear 33. Therefore, rotation transferred to the differential ring gear 35 is distributed to the drive wheels 37 via the differential device 36. Thus, rotation generated by the engine 11 can be transferred to the first counter driven gear 31. Furthermore, rotation generated by the vehicle drive motor 25 can be transferred to the second counter driven gear 32. Therefore, the hybrid vehicle can be run by driving the engine 11 and the vehicle drive motor 25.

In FIG. 3, reference numeral 38 denotes a generator rotor position sensor, such as a resolver or the like, for detecting the position of the rotor 21, that is, the position of the generator rotor position $\theta G$, and 39 denotes a drive motor rotor position sensor, such as a resolver or the like, for detecting the position of the rotor 40, that is, the drive motor rotor position $\theta M$. The detected generator rotor position $\theta G$ is sent to a vehicle control device and the generator control device (not shown). The vehicle drive motor position $\theta M$ is sent to the vehicle control device and a drive motor control device.

An operation of the planetary gear unit 13 will next be described. FIG. 4 is a diagram illustrating an operation of a planetary gear unit in this embodiment of the invention. FIG. 5 is a diagram of vehicle speed for an ordinary run of the vehicle in the embodiment of the invention. FIG. 6 is a diagram of torque for an ordinary vehicle run in the embodiment of the invention.

As for the planetary gear unit 13 (FIG. 3), the carrier CR is connected to the engine 11, and the sun gear S is connected to the generator 16, and the ring gear R is connected to the vehicle drive motor 25 and the drive wheels 37 via the output shaft 14. Therefore, the rotation speed of the ring gear R, that is, the ring gear rotation speed NR, is equal to the rotation speed output to the output shaft 14, that is, the output shaft rotation speed. The rotation speed of the carrier CR is equal to the rotation speed of the engine 11, that is, the engine rotation speed NE. Furthermore, the rotation speed of the sun gear S is equal to the generator rotation speed NG. Then if the number of teeth of the ring gear R is set at $\rho$ times (twice in this embodiment) the number of teeth of the sun gear S, the following relationship holds.

$$(\rho+1) \bullet NE = 1 \bullet NG + \rho NR$$

Therefore, the engine rotation speed NE can be determined from the ring gear rotation speed NR and the generator rotation speed NG as follows.

$$NE = (1 \bullet NG + \rho NR)/(\rho+1) \quad (1)$$

The equation (1) forms a rotation speed relational expression regarding the planetary gear unit 13.

The engine torque TE, the torque produced on the ring gear R, that is, the ring gear torque TR, and the generator torque TG as an electric machine torque have the following relationship:

$$TE:TR:TG = (\rho+1):\rho:1 \quad (2)$$

The three torques receive reactions from one another. The equation (2) forms a torque relational expression regarding the planetary gear unit 13.

During a normal run of the hybrid vehicle, the ring gear R, the carrier CR and the sun gear S are rotated in the forward direction, so that the ring gear rotation speed NR, the engine rotation speed NE and the generator rotation speed NG each assume a positive value, as indicated in FIG. 5. The ring gear torque TR and the generator torque TG can be determined by proportionally distributing the engine torque TE at a torque ratio that is determined by the numbers of teeth of gears of the planetary gear unit 13. Therefore, in a torque diagram shown in FIG. 6, the sum of the ring gear torque TR and the generator torque TG forms the engine torque TE.

Figure 7:
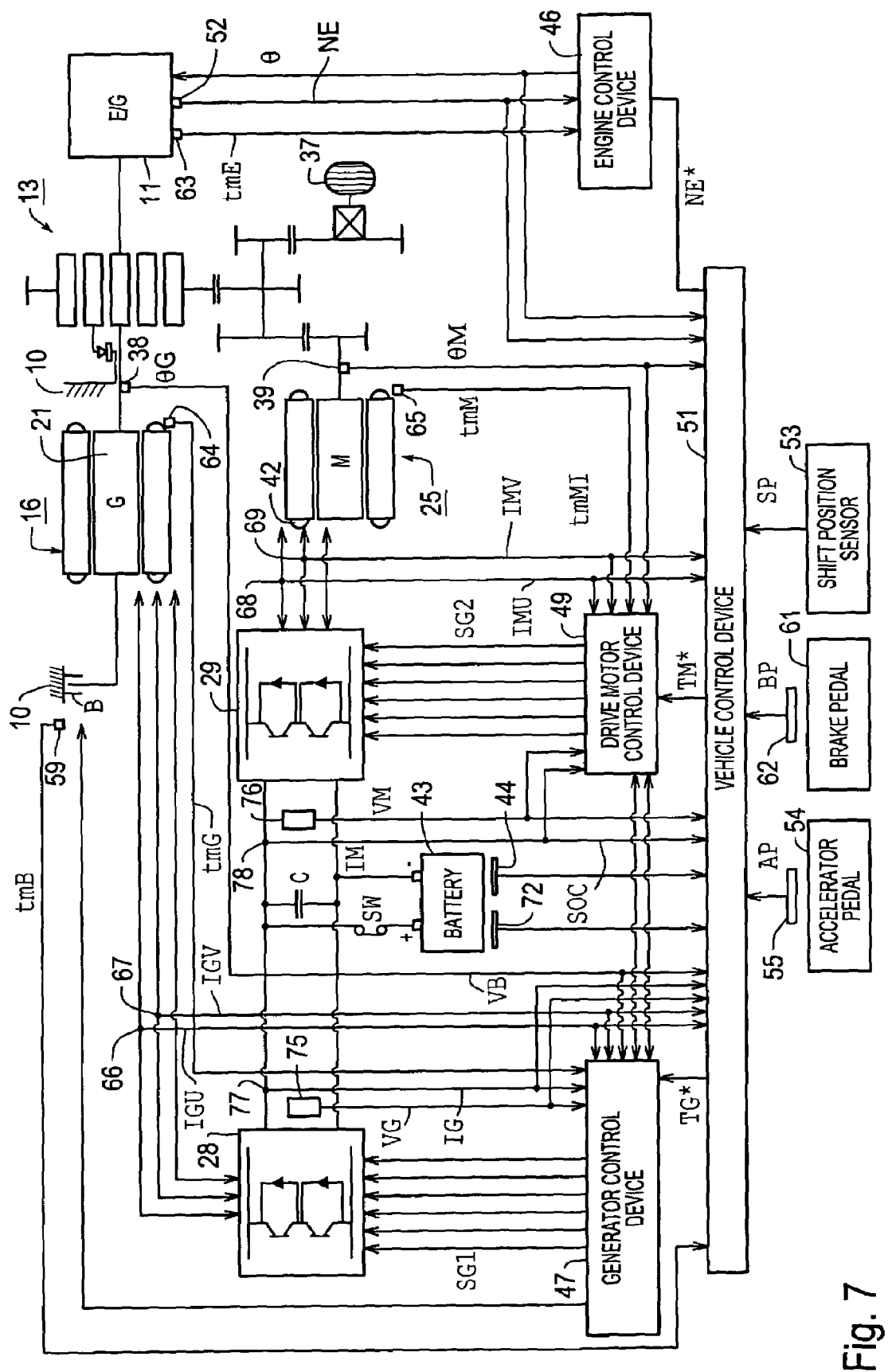
FIG. 7 is a conceptual diagram of a hybrid vehicle drive control apparatus in accordance with an embodiment of the invention.

FIG. 7 is a conceptual diagram of a hybrid vehicle drive control apparatus in an embodiment of the invention. In FIG. 7, reference character 10 denotes the case; 11 denotes the engine (E/G); 13 denotes the planetary gear unit; 16 denotes the generator (G); B denotes the generator brake for fixing the rotor 21 of the generator 16; 25 denotes the vehicle drive motor (M); 28 denotes an inverter as a generator inverter for driving the generator 26; 29 denotes an inverter as a drive motor inverter for driving the vehicle drive motor 25; 37 denotes a drive wheel; 38 denotes a generator rotor position sensor; 39 denotes a drive motor rotor position sensor; and 43 denotes a battery. The inverters 28, 29 are connected to the battery 43 via a power switch SW. When the power switch SW is on, the battery 43 supplies direct current to the inverters 28, 29.

At an input side of the inverter 28, a generator inverter voltage sensor 75 is disposed as a first DC voltage detector portion for detecting the DC voltage applied to the inverter 28, that is, the generator inverter voltage VG. Furthermore, a generator inverter current sensor 77 is disposed as a first direct current detector portion for detecting the direct current supplied to the inverter 28, that is, the generator inverter current IG. At an input side of the inverter 29, a drive motor inverter voltage sensor 76 is disposed as a second DC voltage detector portion for detecting the DC voltage applied to the inverter 29, that is, the drive motor inverter voltage VM. Furthermore, a drive motor inverter current sensor 78 is disposed as a second direct current detection portion for detecting the direct current supplied to the inverter 29, that is, the drive motor inverter current IM. The generator inverter voltage VG and the generator inverter current IG are sent to a generator control device 47 and a vehicle control device 51. The drive motor inverter voltage VM and the drive motor inverter current IM are sent to a drive motor control device 49 and the vehicle control device 51. A smoothing capacitor C is connected between the battery 43 and the inverters 28, 29.

The vehicle control device 51 is formed by a CPU, a recorder device, etc. (which are not shown), and performs overall control of the hybrid vehicle drive apparatus, and functions as a computer on the basis of various programs, data, etc. The vehicle control device 51 is connected to an engine control device 46, the generator control device 47, and the drive motor control device 49. The engine control device 46 is formed by a CPU, a recorder device, etc. (which are not shown), and sends instruction signals regarding the degree of throttle opening θ, the valve timing, etc., to the engine 11 for the purpose of controlling the engine 11. The generator control device 47 is formed by a CPU, a recorder device, etc. (which are not shown), and sends a drive signal SG1 to the inverter 28 for the purpose of control of the generator 16. The drive motor control device 49 is formed by a CPU, a recorder device, etc. (which are not shown), and sends a drive signal SG2 to the inverter 29 for the purpose of control of the vehicle drive motor 25. The engine control device 46, the generator control device 47 and the drive motor control device 49 form a first control apparatus that is at a lower level in the control system than the vehicle control device 51. The vehicle control device 51 forms a second control apparatus that is at a higher level in the control system than the engine control device 46, the generator control device 47 and the drive motor control device 49. The engine control device 46, the generator control device 47 and the drive motor control device 49 also function as computers on the basis of various programs, data, etc.

The inverter 28 is driven in accordance with the drive signal SG1. Specifically, at the time of power running of the vehicle, the inverter 28 receives direct current from the battery 43 to generate currents IGU, IGV, IGW of three phases, and supplies the different-phase currents IGU, IGV, IGW to the generator 16. At the time of regenerative braking, the inverter 28 receives currents IGU, IGV, IGW of three phases from the generator 16 to generate a direct current, and supplies the direct current to the battery 43.

The inverter 29 is driven in accordance with the drive signal SG2. Specifically, at the time of power running of the vehicle, the inverter 28 receives direct current from the battery 43 to generate currents IMU, IMV, IMW of three phases, and supplies the different-phase currents IMU, IMV, IMW to the vehicle drive motor 25. At the time of regenerative braking, the inverter 29 receives currents IMU, IMV, IMW of three phases from the drive motor 25 to generate a direct current, and supplies the direct current to the battery 43.

In FIG. 7, reference numeral 44 denotes a state-of-charge detector device that detects the state of the battery 43, that is, the amount of remaining charge SOC as a state of the battery 43; 52 denotes an engine rotation speed sensor as an engine rotation speed detector portion for detecting the engine rotation speed NE; 53 denotes a shift position sensor for detecting the position of a shift lever (not shown) provided as a speed selection operation unit, that is, the shift position SP; 54 denotes an accelerator pedal; 55 denotes an accelerator switch as an accelerator operation detector portion for detecting the position (amount of depression) of the accelerator pedal 54, that is, the accelerator pedal position AP; 59 denotes an oil temperature sensor as an oil temperature detector portion for detecting the temperature of an oil in an hydraulic servo of the generator brake B, that is, the oil temperature tmB; 61 denotes a brake pedal; 62 denotes a brake switch as a brake operation detector portion for detecting the position (amount of depression) of the brake pedal 61, that is, the brake pedal position BP; 63 denotes an engine temperature sensor for detecting the temperature tmE of the engine 11; 64 denotes a generator temperature sensor as a first temperature detector portion for detecting the temperature of the generator 16, for example, the temperature tmG of the coils 23; and 65 denotes a drive motor temperature sensor as a second temperature detector portion for detecting the temperature of the vehicle drive motor 25, for example, the temperature tmM of the coils 42.

Furthermore, reference numerals 66 to 69 denote current sensors as alternating current detector portions for detecting the different-phase currents IGU, IGV, IMU, IMV, and reference numeral 72 denotes a battery voltage sensor as a battery-dedicated voltage detector portion for detecting the battery voltage VB as the state of the battery 43. The battery voltage VB and the amount of battery charge SOC are sent to the generator control device 47, the drive motor control device 49 and the vehicle control device 51. As for the state of battery 43, it is also possible to detect a battery current, a battery temperature, or the like. The state-of-battery-charge detector device 44, the battery voltage sensor 72, a battery current sensor (not shown), a battery temperature sensor, etc. form a state-of-battery-charge detector portion. The detected currents IGU, IGV are sent to the generator control device 47 and the vehicle control device 51, and the electric currents IMU, IMV are sent to the drive motor control device 49 and the vehicle control device 51.

The vehicle control device 51 sends an engine control signal to the engine control device 46 so as to cause the engine control device 46 to set the driving/stopping of the engine 11. A vehicle speed calculation unit (not shown) of the vehicle control device 51 performs a vehicle speed calculation process of calculating a rate of change ΔθM of the drive motor rotor position θM and calculating a vehicle speed V based on the rate of change ΔθM, and the gear ratio γV of a torque transfer system from the output shaft 26 (FIG. 3) to the drive wheels 37.

The vehicle control device 51 determines a target engine rotation speed NE* that represents a target value of the engine rotation speed NE, a target generator torque TG* that represents a target value of the generator torque TG, and a target drive motor torque TM* that represents a target value of the drive motor torque TM. The generator control device 47 sets a target generator rotation speed NG* that represents a target value of the generator rotation speed NG. The drive motor control device 49 sets a drive motor torque correction value δTM that represents a correction value of the drive motor torque TM. Control instruction values are formed by the target engine rotation speed NE*, the target generator torque TG*, the target drive motor torque TM*, etc.

A generator rotation speed calculation unit (not shown) of the generator control device 47 performs a generator rotation speed calculation process of inputting the generator rotor position θG and calculating the rotation speed of the generator 16, that is, the generator rotation speed NG, by calculating the rate of change ΔθG of the generator rotor position θG.

A drive motor rotation speed calculation unit (not shown) of the drive motor control device 49 performs a drive motor rotation speed calculation process of inputting the drive motor rotor position θM and calculating the rotation speed of the vehicle drive motor 25, that is, the drive motor rotation speed NM, by calculating the rate of change ΔθM of the drive motor rotor position θM.

The generator rotor position θG and the generator rotation speed NG are proportional to each other, and the drive motor rotor position θM, the drive motor rotation speed NM and the vehicle speed V are proportional to one another. Therefore, it is possible to cause the generator rotor position sensor 38 and the generator rotation speed calculation unit to function as a generator rotation speed detector portion that detects the generator rotation speed NG, and cause the drive motor rotor position sensor 39 and the drive motor rotation speed calculation unit to function as a drive motor rotation speed detector portion that detects the drive motor rotation speed NM, and cause the drive motor rotor position sensor 39 and the vehicle speed calculation unit to function as a vehicle speed detector portion that detects the vehicle speed V.

Although in this embodiment, the engine rotation speed sensor 52 is used to detect the engine rotation speed NE, the engine rotation speed NE may also be determined by the engine control device 46. Furthermore, although in the embodiment, the vehicle speed V is calculated on the basis of the drive motor rotor position θM by the vehicle speed calculation unit, the vehicle speed V may also be calculated on the basis of the ring gear rotation speed NR detected, or may be calculated on the basis of the rotation speed of the drive wheels, that is, the drive wheel rotation speed. In that case, a ring gear rotation speed sensor, or a drive wheel rotation speed sensor, or the like is disposed as a vehicle speed detector portion.

An operation of the hybrid vehicle drive control apparatus having the above-described structure will be described below.

Figure 8:
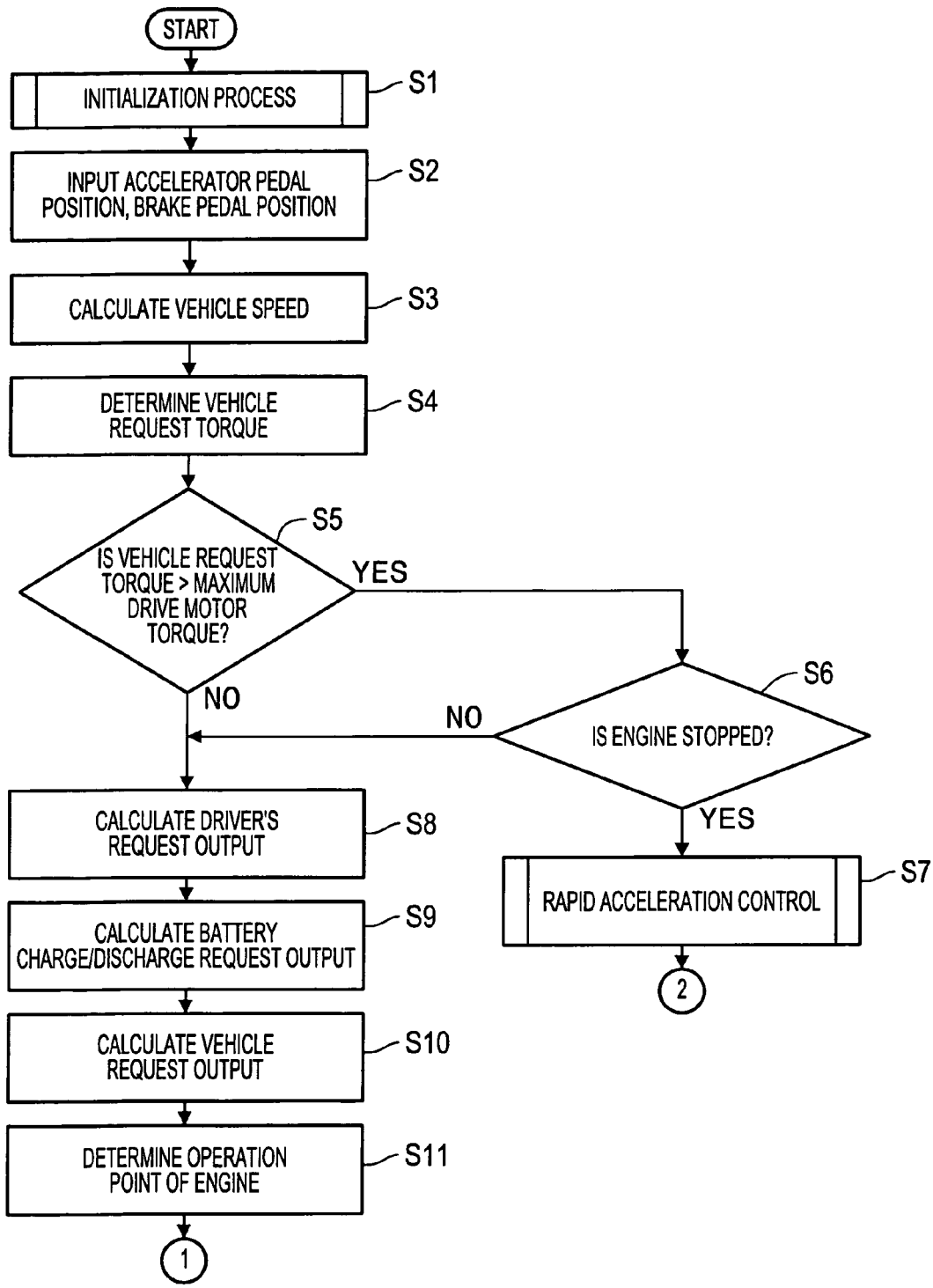
FIG. 8 is the first main flowchart illustrating an operation of the hybrid vehicle drive control apparatus in accordance with an embodiment of the invention.
Figure 9:
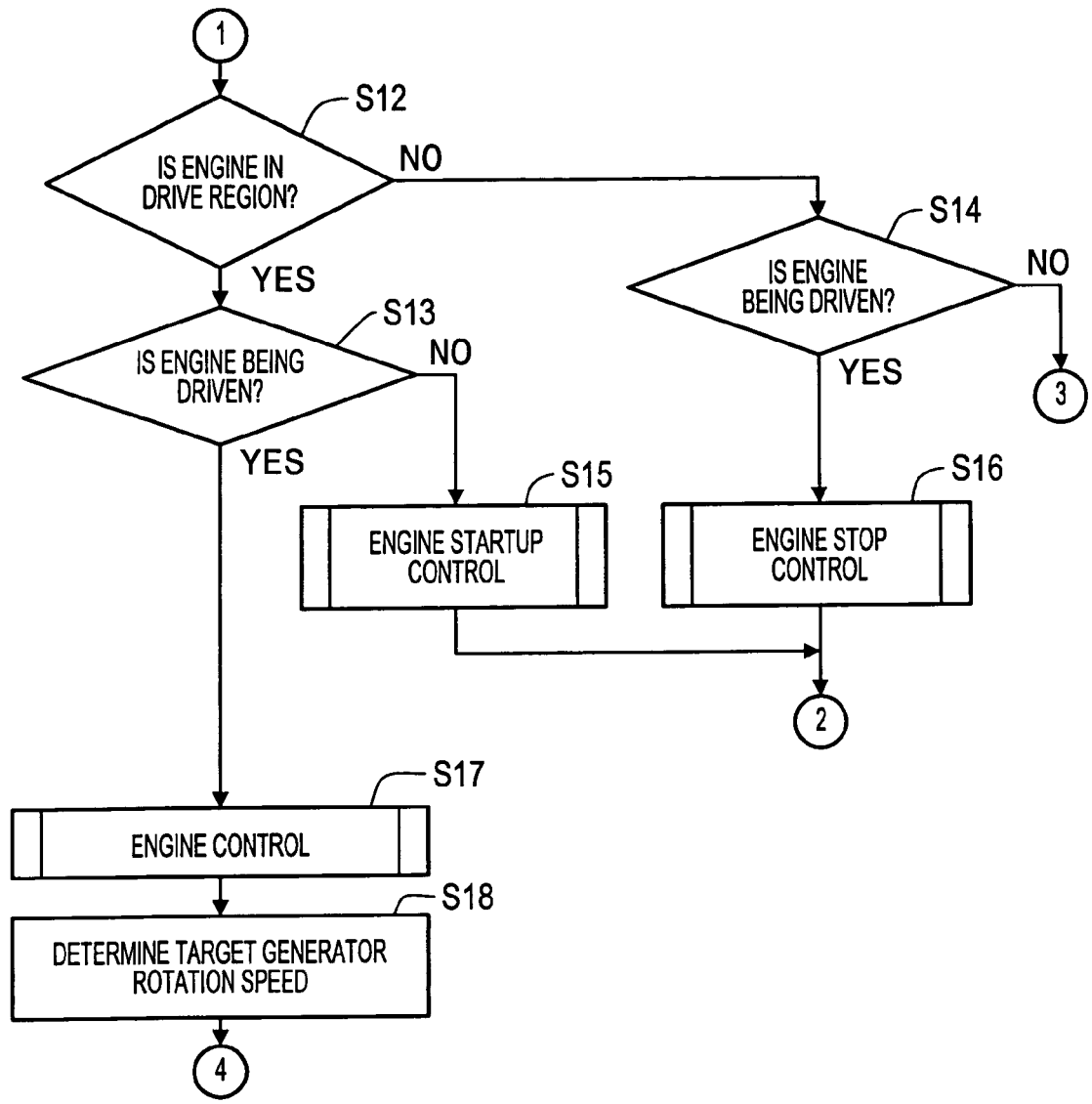
FIG. 9 is the second main flowchart illustrating the operation of the hybrid vehicle drive control apparatus in accordance with the embodiment of the invention.
Figure 10:
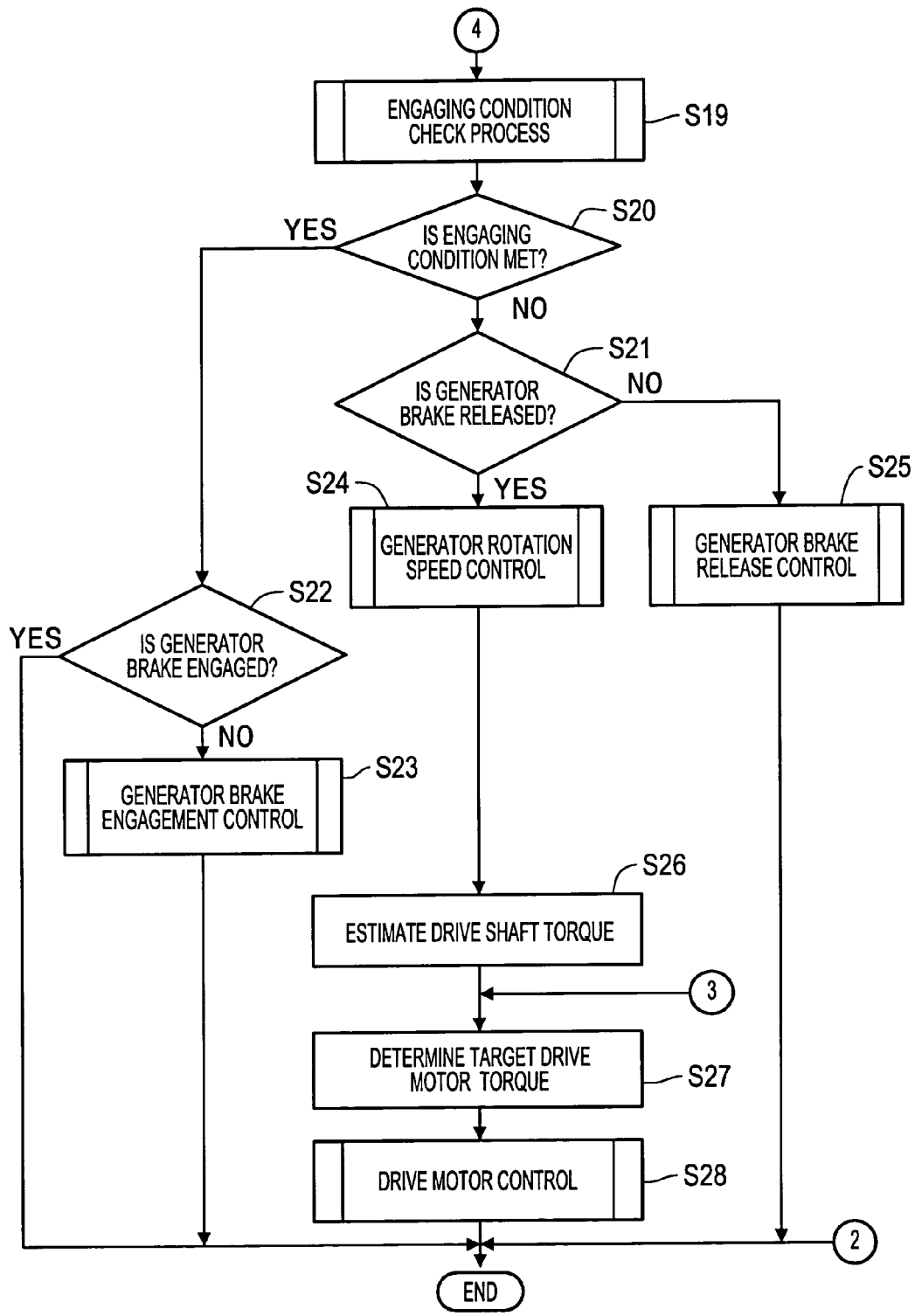
FIG. 10 is the third main flowchart illustrating the operation of the hybrid vehicle drive control apparatus in accordance with the embodiment of the invention.
Figure 11:
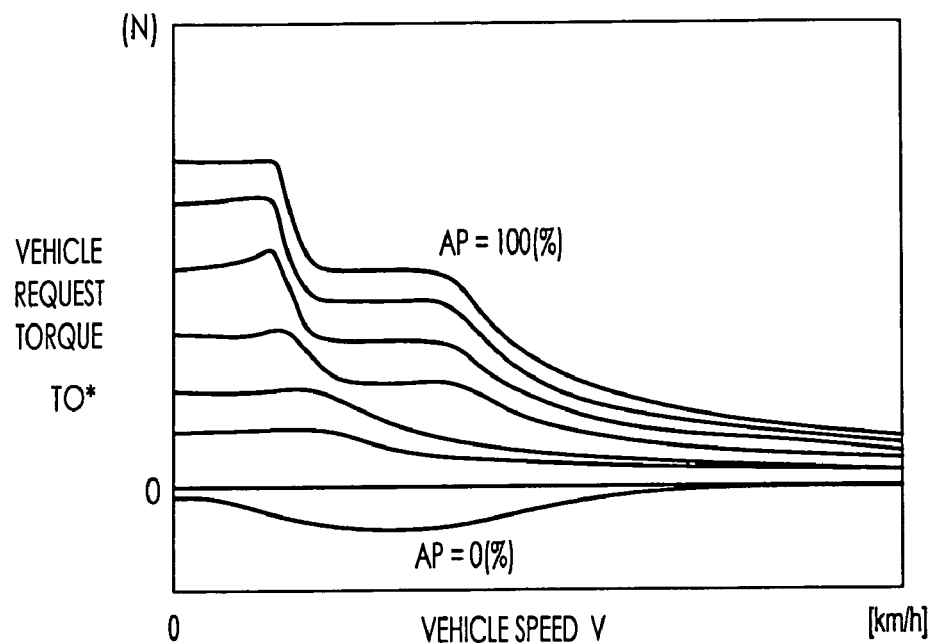
FIG. 11 is a diagram indicating a first vehicle request torque map in accordance with an embodiment of the invention.
Figure 12:
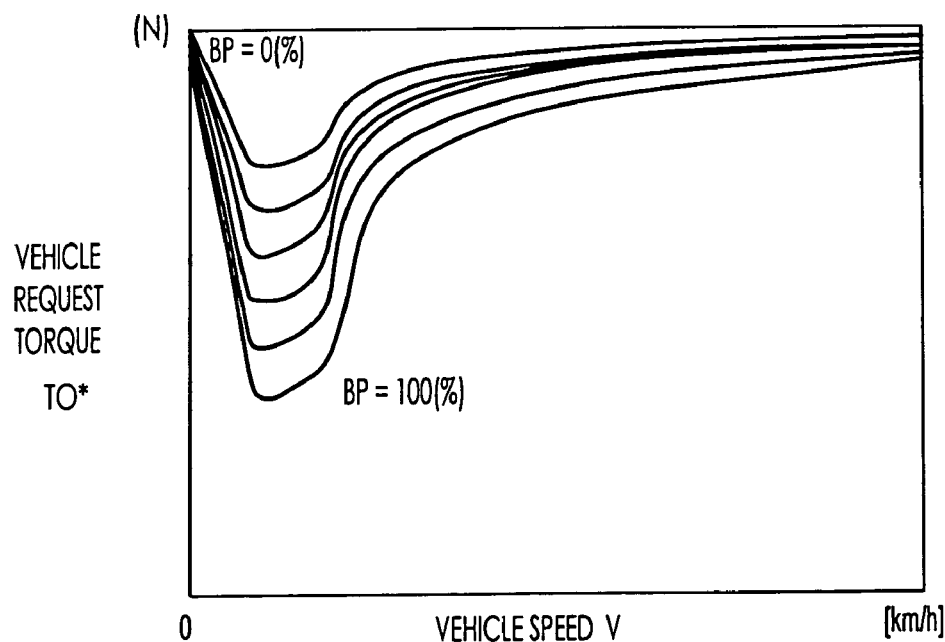
FIG. 12 is a diagram indicating a second vehicle request torque map in accordance with an embodiment of the invention.
Figure 13:
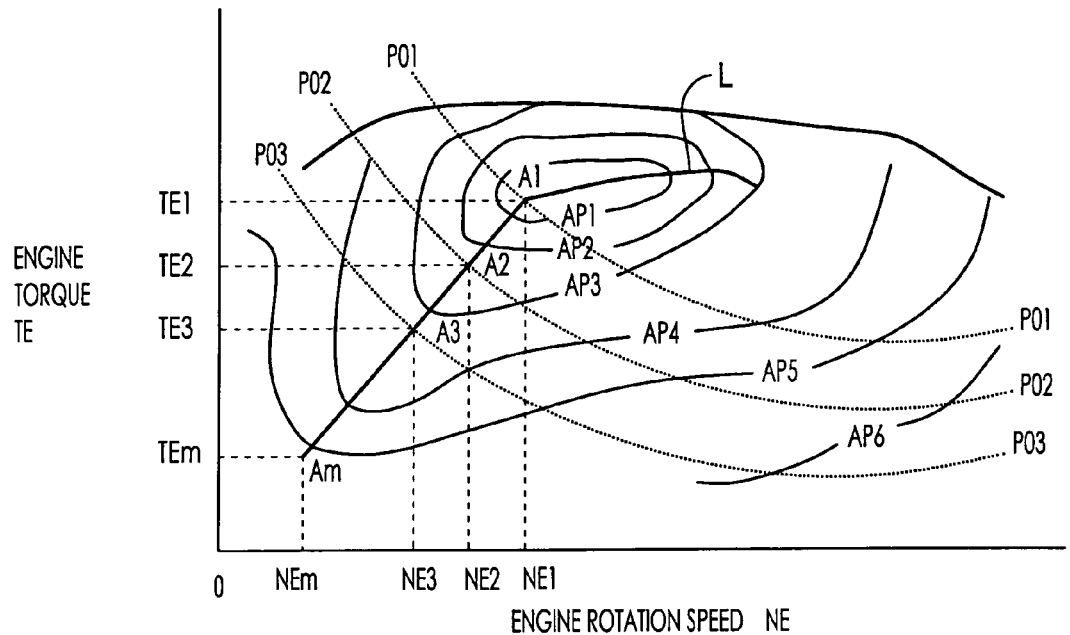
FIG. 13 is a diagram indicating a target engine operation state map in accordance with an embodiment of the invention.
Figure 14:
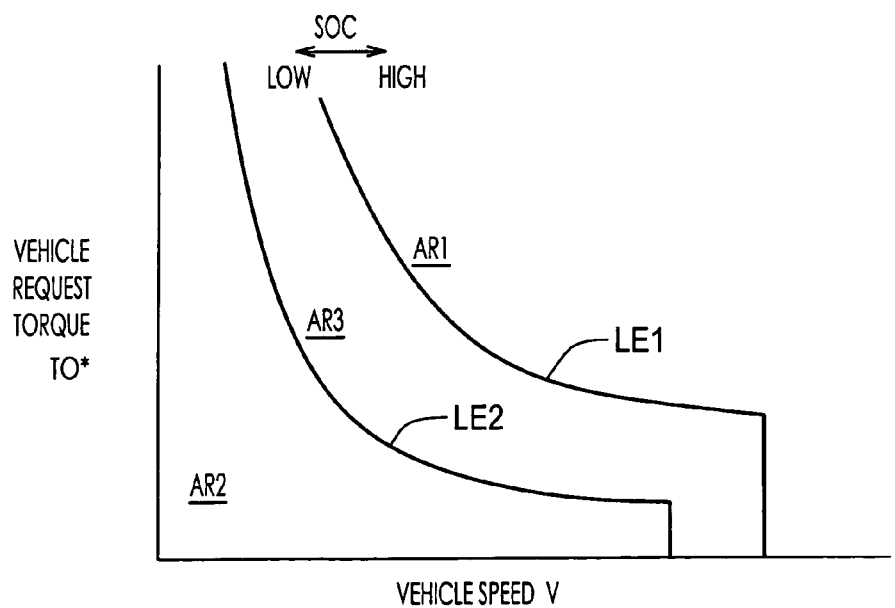
FIG. 14 is a diagram indicating an engine drive region map in accordance with an embodiment of the invention.

FIG. 8 is the first main flowchart illustrating an operation of a hybrid vehicle drive control apparatus in accordance with an embodiment of the invention. FIG. 9 is the second main flowchart illustrating the operation of the hybrid vehicle drive control apparatus of the embodiment of the invention. FIG. 10 is the third main flowchart illustrating the operation of the hybrid vehicle of the embodiment of the invention. FIG. 11 is a diagram indicating a first vehicle request torque map in an embodiment of the invention. FIG. 12 is a diagram indicating a second vehicle request torque map in an embodiment of the invention. FIG. 13 is a diagram indicating a target engine operation state map in an embodiment of the invention. FIG. 14 is a diagram indicating an engine drive region map in an embodiment of the invention. In FIGS. 11, 12 and 14, the horizontal axis indicates the vehicle speed V, and the vertical axis indicates the vehicle request torque TO*. In FIG. 13, the horizontal axis indicates the engine rotation speed NE, and the vertical axis indicates the engine torque TE.

First, an initialization unit (not shown) of the vehicle control device 51 (FIG. 7) sets various kinds of variables to initial values through an initialization process. Next, the vehicle control device 51 inputs the accelerator pedal position AP from the accelerator switch 55, and inputs the brake pedal position BP from the brake switch 62. Then, the vehicle speed calculation unit inputs the drive motor rotor position θM, and calculates the rate of change ΔθM of the drive motor rotor position θM, and calculates the vehicle speed V based on the rate of change ΔθM and the gear ratios γV.

Subsequently, a vehicle request torque determination unit (not shown) of the vehicle control device 51 performs a vehicle request torque determination process of determining a vehicle request torque TO* needed to run the hybrid vehicle. The torque is pre-set to correspond to the vehicle speed V, the accelerator pedal position AP and the brake pedal position BP, by referring to the first vehicle request torque map of FIG. 11 recorded in the recorder device of the vehicle control device 51 if the accelerator pedal 54 is depressed, and by referring to the second vehicle request torque map of FIG. 12 recorded in the recorder device if the brake pedal 61 is depressed.

Subsequently, the vehicle control device 51 determines whether the vehicle request torque TO* is greater than a drive motor maximum torque TMmax pre-set as a rated torque of the vehicle drive motor 25. If the vehicle request torque TO* is greater than the drive motor maximum torque TMmax, the engine control device 46 determines whether the engine 11 is at a stop. If the engine 11 is at a stop, a rapid acceleration control unit (not shown) of the vehicle control device 51 performs a rapid acceleration control process of driving the vehicle drive motor 25 and the generator 18 so as to run the hybrid vehicle.

Conversely, if the vehicle request torque TO* is less than or equal to the drive motor maximum torque TMmax, or if the vehicle request torque TO* is greater than the drive motor maximum torque TMmax and the engine 11 is in operation, a driver's request output calculation unit (not shown) of the vehicle control device 51 performs a driver's output calculation process of calculating a driver's request output PD by multiplying the vehicle request torque TO* by the vehicle speed V.

$$PD=TO^* \bullet V$$

Next, a battery charge/discharge request output calculation unit (not shown) of the vehicle control device 51 performs a battery charge/discharge request output calculation process of inputting the amount of battery charge SOC from the state-of-charge detector device 44 and calculating a battery charge/discharge request output PB based on the amount of battery charge SOC.

Subsequently, a vehicle request output calculation unit (not shown) of the vehicle control device 51 performs a vehicle request output calculation process of calculating a vehicle request output PO by adding the driver's request output PD to the battery charge/discharge request output PB.

$$PO=PD+PB$$

Next, a target engine operation state setting unit (not shown) of the vehicle control device 51 performs a target engine operation state setting process as follows. That is, with reference to the target engine operation state map of FIG. 13 recorded in the recorder device of the vehicle control device 51, the target engine operation state setting unit determines the point A1 to A3, Am of intersection between a line PO1, PO2, . . . indicating the vehicle request output and an optimal fuel consumption curve L that provides the highest efficiency of the engine 11 at the accelerator pedal position AP1 to AP6, as an operation point of the engine 11 that is a target engine operation state. The setting unit then determines the engine torque TE1 to TE3, TEm of the operation point as a target engine torque TE* that represents the target value of the engine torque TE. The unit determines the engine rotation speed NE1 to NE3, NEm of the operation point as a target engine rotation speed NE*, and sends the target engine rotation speed NE* to the engine control device 46.

Then, the engine control device 46 determines whether the engine 11 is in a drive region AR1 with reference to the engine drive region map of FIG. 14 recorded in the recorder device of the engine control device 46. In FIG. 14, reference character AR1 denotes a drive region where the engine 11 is driven; AR2 denotes a stop region where the driving of the engine 11 is stopped; and AR3 denotes a hysteresis region. Furthermore, LE1 denotes a line across which the engine 11 in a stopped state is changed to a driven state; and LE2 is a line across which the driving of the engine 11 is stopped. The line LE1 is moved toward the right side in FIG. 14 so as to reduce the drive region AR1 as the amount of battery charge SOC increases. As the amount of battery charge SOC decreases, the line LE1 is moved toward the left side in FIG. 14 so as to increase the drive region AR1.

If the engine 11 is not driven although the engine 11 is in the drive region AR1, an engine startup control unit (not shown) of the engine control device 46 performs an engine startup control process to start up the engine 11. If the engine 11 is being driven although the engine 11 is not in the drive region AR1, an engine stop control unit (not shown) of the engine control device 46 performs an engine stop control process to stop the driving of the engine 11. If the engine 11 is in the stopped state while the engine 11 is not in the drive region AR1, a target drive motor calculation unit (not shown) of the vehicle control device 51 performs a target drive motor torque calculation process of calculating and determining the vehicle request torque TO* as a target drive motor torque TM* and outputting the target drive motor torque TM* to the drive motor control device 49. A drive motor control process unit (not shown) of the drive motor control device 49 performs a drive motor control process of controlling the torque of the vehicle drive motor 25. If the engine 11 is in the drive region AR1 and is being driven, an engine control process unit (not shown) of the engine control device 46 performs an engine control process of controlling the engine 11 in a predetermined method.

Next, a target generator rotation speed calculation unit (not shown) of the generator control device 47 performs a target generator rotation speed calculation process. Specifically, the target generator rotation speed calculation unit inputs the drive motor rotor position θM from the drive motor rotor position sensor 39, and calculates a ring gear rotation speed NR based on the drive motor rotor position θM and the gear ratio γR of the transfer path from the output shaft 26 (FIG. 3) to the ring gear R, and inputs the target engine rotation speed NE* determined by the target engine operation state setting process, and calculates and determines a target generator rotation speed NG* from the ring gear rotation speed NR and the target engine rotation speed NE* as in the aforementioned rotation speed relational expression.

If the generator rotation speed NG becomes low while the above-described hybrid vehicle is running in a motor-engine drive mode, the electric power consumption increases, and the electric power generation efficiency of the generator 16 decreases, so that the fuel economy of the hybrid vehicle correspondingly degrades. An engaging condition check unit (not shown) of the generator control device 47 performs an engaging condition check process to determine whether a predetermined engaging condition, for example, a condition that the absolute value of the generator rotation speed NG is less than a predetermined rotation speed, or the like, is fulfilled. If the engaging condition is met, a brake signal indicating a generator brake engagement request that requests engagement of the generator brake B is turned on. If the engaging condition is not met, the brake signal is turned off.

If the engaging condition is fulfilled, the generator control device 47 then determines whether the generator brake B is in an engaged state. If the generator brake B is not in the engaged state, the generator brake engagement control unit 91 (FIG. 1) of the generator control device 47 performs a generator brake engagement process to engage the generator brake B.

Conversely, if the engaging condition is not fulfilled, the generator control device 47 determines whether the generator brake B is in a released state. If the generator brake B is in the released state, a generator rotation speed control unit (not shown) of the generator control device 47 performs a generator rotation speed control process, and controls the torque of the generator 16 on the basis of the generator rotation speed NG. If the generator brake B is not in the released state, a generator brake release control unit (not shown) of the generator control device 47 performs a generator brake release control process to release the generator brake B.

In the above-described generator rotation speed control process, the target generator torque TG* is determined on the basis of the generator rotation speed NG, and the torque control of the generator 16 is performed on the basis of the target generator torque TG* so that a predetermined generator torque TG is generated. Then, the generator torque TG is converted into the ring gear torque TR and the ring gear torque TR is output from the ring gear R since the engine torque TE, the ring gear torque TR and the generator torque TG receive reactions from one another as mentioned above.

Then, as the ring gear torque TR is output from the ring gear R, the generator rotation speed NG changes and the ring gear torque TR changes. As the changed ring gear torque TR is transferred to the drive wheels 37, the drive feel of the hybrid vehicle degrades. To avoid or mitigate this problem, the ring gear torque TR is calculated while an amount of torque corresponding to the inertia of the generator 16 related to the change in the generator rotation speed NG is taken into account. To this end, a ring gear torque calculation unit (not shown) of the vehicle control device 51 performs a ring gear torque calculation process of inputting the target generator torque TG* and calculating the ring gear torque TR based on the target generator torque TG* and the ratio of the number of teeth of the ring gear R to the number of teeth of the sun gear S.

The torque that acts on the sun gear S, that is, the sun gear torque TS, is determined by adding a torque-equivalent component (inertia torque) TGI corresponding to the inertia InG of the generator 16 (TGI=InG•αG where αG is the angular acceleration (rotation change rate) of the generator 18) to the target generator torque TG*.

$$TS = TG* + TGI \qquad (3)$$
$$= TG* + InG \cdot \alpha G$$

Normally, the torque-equivalent component TGI assumes a negative value in the direction of acceleration during acceleration of the hybrid vehicle, and assumes a positive value in the direction of acceleration during deceleration of the hybrid vehicle. The angular acceleration αG can be calculated by differentiating the generator rotation speed NG.

If the number of teeth of the ring gear R is p times the number of teeth of the sun gear S, the ring gear torque TR is p times the sun gear torque TS, and can be expressed as follows.

$$TR = \rho \cdot TS \quad (4)$$
$$= \rho \cdot (TG* + TGI)$$
$$= \rho \cdot (TG* + InG \cdot \alpha G)$$

In this manner, the ring gear torque TR can be calculated from the target generator torque TG* and the torque equivalent component TGI.

Therefore, a drive shaft torque estimation unit (not shown) of the drive motor control device 49 performs a drive shaft torque estimation process of estimating a torque on the output shaft 26, that is, a drive shaft torque TR/OUT, on the basis of the target generator torque TG* and the torque-equivalent component TGI. More specifically, the drive shaft torque estimation unit estimates and determines the drive shaft torque TR/OUT on the basis of the ring gear torque TR and the ratio of the number of teeth of the second counter drive gear 27 to the number of teeth of the ring gear R.

When the generator brake B is engaged, the target generator torque TG* is set to zero (0), and therefore, the ring gear torque TR comes to have a proportional relationship to the engine torque TE. Therefore, when the generator brake B is engaged, the drive shaft torque estimation unit inputs the engine torque TE from the engine control device 46, and calculates the ring gear torque TR from the engine torque TE as in the aforementioned torque relational expression, and estimates the drive shaft torque TR/OUT on the basis of the ring gear torque TR and the ratio of the number of teeth of the second counter drive gear 27 to the number of teeth of the ring gear R.

Subsequently, the target drive motor torque calculation unit performs a target drive motor torque calculation process of subtracting the drive shaft torque TR/OUT from the vehicle request torque TO* so as to calculate and determine the shortfall of the drive shaft torque TR/OUT as a target drive motor torque TM*. The drive motor control process unit performs the drive motor control process of controlling the drive motor torque TM through a torque control of the vehicle drive motor 25 based on the determined target drive motor torque TM*.

The flowchart shown in FIGS. 8 to 10 will be described. In step S1, an initialization is performed. In step S2, the accelerator pedal position AP and the brake pedal position BP are input. Then, in step S3, a vehicle speed is calculated and, in step S4, a vehicle request torque TO* is determined.

In step S5, a determination is made as to whether the vehicle request torque TO* is greater than the drive motor maximum torque Tmax. If the vehicle request torque TO* is greater than the drive motor maximum torque TMmax, the process proceeds to step S6. If the vehicle request torque TO* is less than or equal to the drive motor maximum torque Tmax, the process proceeds to step S8.

In step S6, a determination is made as to whether the engine 11 is in the stopped state. If the engine 11 is in the stopped state, the process proceeds to step S7. If the engine 11 is not in the stopped state (is driven), the process proceeds to step S8. In step S7, the rapid acceleration control process is performed. After that, the process ends.

In Step S8, a driver's request output PD is calculated, in step S9, a battery charge/discharge request output PB is calculated, in step S10, a vehicle request torque PO is calculated, and in step S11, a point of operation of the engine 11 is determined. In step S12, a determination is made as to whether the engine 11 is in the drive region AR1. If the engine 11 is in the drive region AR1, the process proceeds to step S13. If the engine 11 is not in the drive region AR1, the process proceeds to step S14.

In step S13, a determination is made as to whether the engine 11 is being driven. If the engine 11 is being driven, the process proceeds to step S17. If the engine 11 is not being driven, the process proceeds to step S15 where the engine startup control process is performed. After that, the process ends. In step S14, a determination is made as to whether the engine 11 is being driven. If the engine 11 is being driven, the process proceeds to step S16 where the engine stop control process is performed. After that, the process ends. If the engine 11 is not being driven, the process proceeds to step S27.

In step S17, the engine control process is performed, in step S18, the target generator rotation speed NG* is determined, and in step S19, the engaging condition check process is performed. In step S20, a determination is made as to whether the engaging condition is met. If the engaging condition is met, the process proceeds to step S22. If the engaging condition is not met, the process proceeds to step S21.

In step S21, a determination is made as to whether the generator brake B is in the released state. If the generator brake B is in the released state, the process proceeds to step S24. If the generator brake B is not in the released state, the process proceeds to step S25, where the generator brake release control process is performed. After that, the process ends.

In step S22, a determination is made as to whether the generator brake B is in the engaged state. If the generator brake B is in the engaged state, the process ends. If the generator brake B is not in the engaged state, the process proceeds to step S23, where the generator brake engagement control process is performed. After that, the process ends. In step S24, the generator rotation speed control process is performed, in step S26, the drive shaft torque TR/OUT is estimated, in step S27, the target drive motor torque TM* is determined, and in step S28, the drive motor control process is performed. After that, the process ends.

Figure 15:
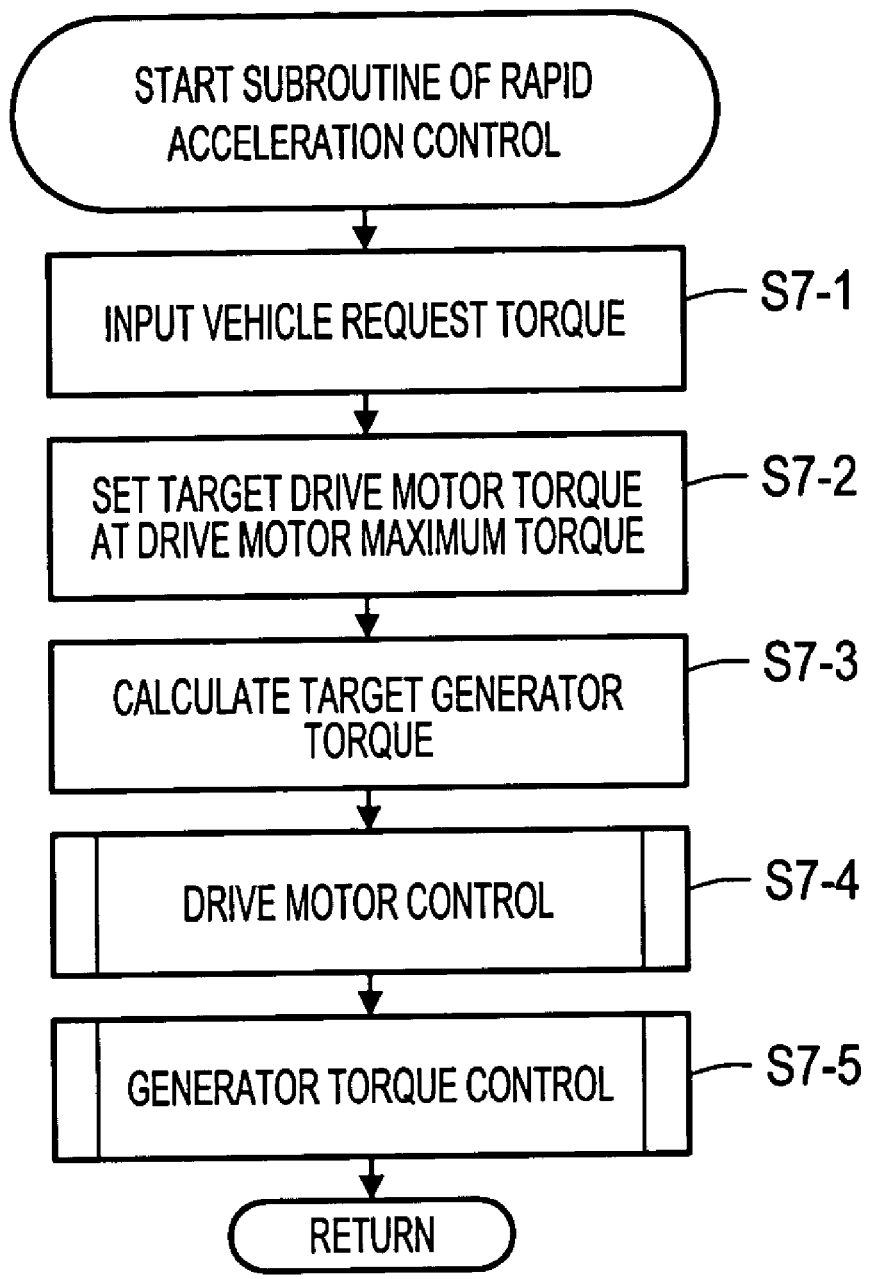
FIG. 15 is a flowchart illustrating a subroutine of a rapid acceleration control process in accordance with an embodiment of the invention.

Next described will be a subroutine of the rapid acceleration control process at step S7 in FIG. 8. FIG. 15 is a flowchart illustrating the subroutine of the rapid acceleration control process in an embodiment of the invention. The rapid acceleration control unit inputs the vehicle request torque TO* and sets the target drive motor torque TM* at the drive motor maximum torque TMmax. Subsequently, the target generator torque calculation unit (not shown) of the vehicle control device 51 (FIG. 7) performs the target generator torque calculation process. In this process, the target generator torque calculation unit calculates the difference torque AR between the vehicle request torque TO* and the target drive motor torque TM*, and calculates and determines the shortfall of the drive motor maximum torque TMmax, which is equal to the target drive motor torque TM*, as a target generator torque TG*. Then, the target generator torque calculation unit sends the target generator torque TG* to the generator control device 47.

Then, the drive motor control process unit performs the drive motor control process of controlling the torque of the vehicle drive motor 25 using the target drive motor torque TM*. A generator torque control unit (not shown) of the generator control device 47 performs a generator torque control process of controlling the torque of the generator 16 on the basis of the target generator torque TG*.

The flowchart of FIG. 15 will be described below. In step S7-1, the vehicle request torque TO* is input, in step S7-2, the target drive motor torque TM* is set at the drive motor maximum torque TMmax. In step S7-3, the target generator torque TG* is calculated, in step S7-4, a drive motor control process is performed, and in step S7-5, the generator torque control process is performed. The process then returns to the initial step.

Figure 16:
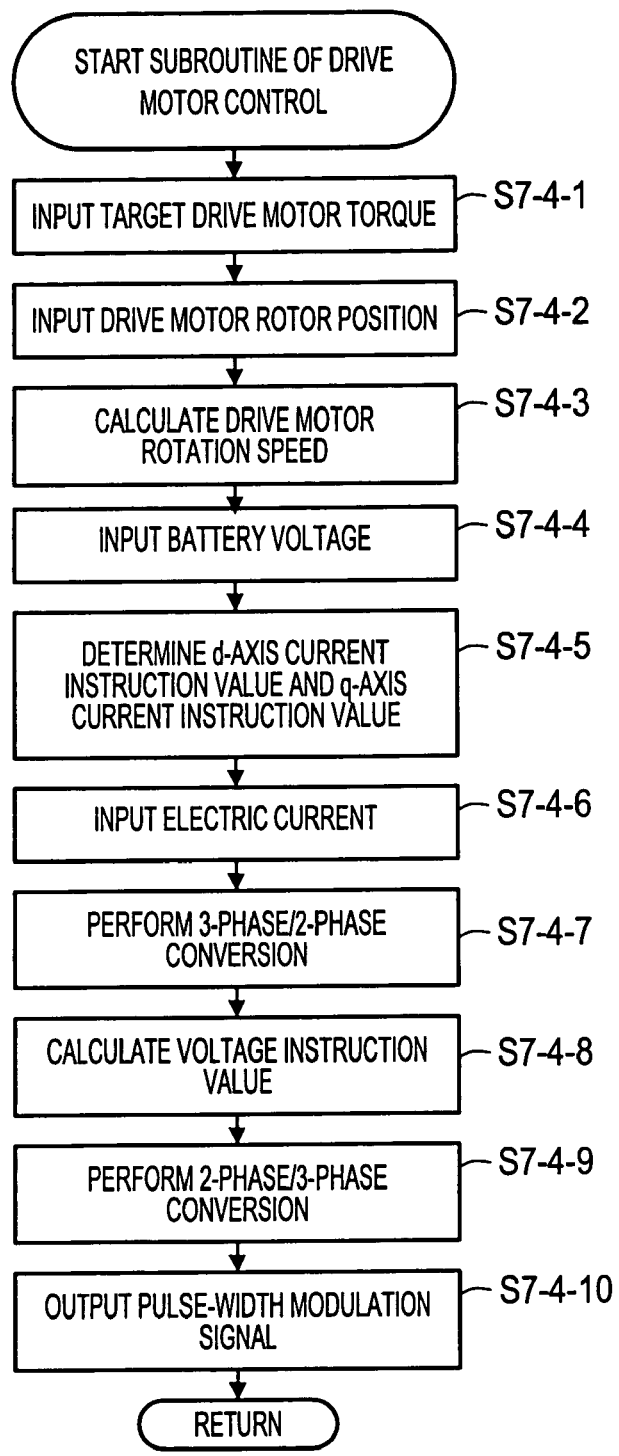
FIG. 16 is a flowchart illustrating a subroutine of a drive motor control process in accordance with an embodiment of the invention.

A subroutine of the drive motor control process performed at the step S28 in FIG. 10 and at the step S7-4 in FIG. 15 will be described below. FIG. 16 is a flowchart illustrating a subroutine of the drive motor control process in an embodiment of the invention. First, the drive motor control process unit inputs the target drive motor torque TM*. Subsequently, the drive motor rotation speed calculation unit inputs the drive motor rotor position θM, and calculates a drive motor rotation speed NM by calculating a rate of change ΔθM of the drive motor rotor position θM. The drive motor control process unit inputs the battery voltage VB. The drive motor rotation speed NM and the battery voltage VB are actually measured values.

Subsequently, the drive motor control process unit calculates and determines a d-axis electric current instruction value IMd* and a q-axis electric current instruction value IMq* on the basis of the target drive motor torque TM*, the drive motor rotation speed NM and the battery voltage VB with reference to the drive motor control-purposed electric current instruction value map recorded in the recorder device of the drive motor control device 49 (FIG. 7). The d-axis current instruction value IMd* and the q-axis current instruction value IMq* form alternating current instruction values for the vehicle drive motor 25.

The drive motor control process unit inputs the currents IMU, IMV from the current sensors 68, 69, and calculates a current IMW from the currents IMU, IMV.

$$IMW=IMU-IMV$$

The current IMW may also be detected by a current sensor as in the case of the currents IMU, IMV. Subsequently, an alternating current calculation unit of the drive motor control process unit performs an alternating current calculation process. That is, the alternating current calculation unit calculates a d-axis alternating current IMd and a q-axis alternating current IMq by converting the currents IMU, IMV, IMW into the d-axis current and the q-axis current through the three-phase/two-phase conversion. An AC voltage instruction value calculation unit of the drive motor control process unit performs an AC voltage instruction value calculation process of calculating voltage instruction values VMd*, VMq* based on the d-axis current IMd and the q-axis current IMq, and the d-axis current instruction value IMd* and the q-axis current instruction value IMq*. Furthermore, the drive motor control process unit converts the voltage instruction values VMd*, VMq* into voltage instruction values VMU*, VMV*, VMW* through the two-phase/three-phase conversion. The drive motor control process unit then calculates pulse width modulation signals SU, SV, SW based on the voltage instruction values VMU*, VMV*, VMW*, and outputs the pulse width modulation signals SU, SV, SW to a drive process unit (not shown) of the drive motor control device 49. The drive process unit performs a drive process, and sends a drive signal SG2 to the inverter 29 on the basis of the pulse width modulation signals SU, SV, SW. It is to be noted herein that the voltage instruction values VMd*, VMq* form AC voltage instruction values for the vehicle drive motor 25.

The flowchart will next be described. The process of step S27 is the same as the process of step S7-4. The process of step S7-4 will be described below. In step S7-4-1, the target drive motor torque TM* is input, in step S7-4-2, the drive motor rotor position θM is input, in step S7-4-3, the drive motor rotation speed NM is calculated, in step S7-4-4, the battery voltage VB is input, and in step S7-4-5, the d-axis current instruction value IMd* and the q-axis current instruction value IMq* are determined. In step S7-4-6, the currents IMU, IMV are input, in step S7-4-7, the three-phase/two-phase conversion is performed, in step S7-4-8, the voltage instruction values VMd*, VMq* are calculated, in step S7-4-9, the two-phase/three-phase conversion is performed, and in step S7-4-10, the pulse width modulation signals SU, SV, SW are output. Then, the process returns.

Figure 17:
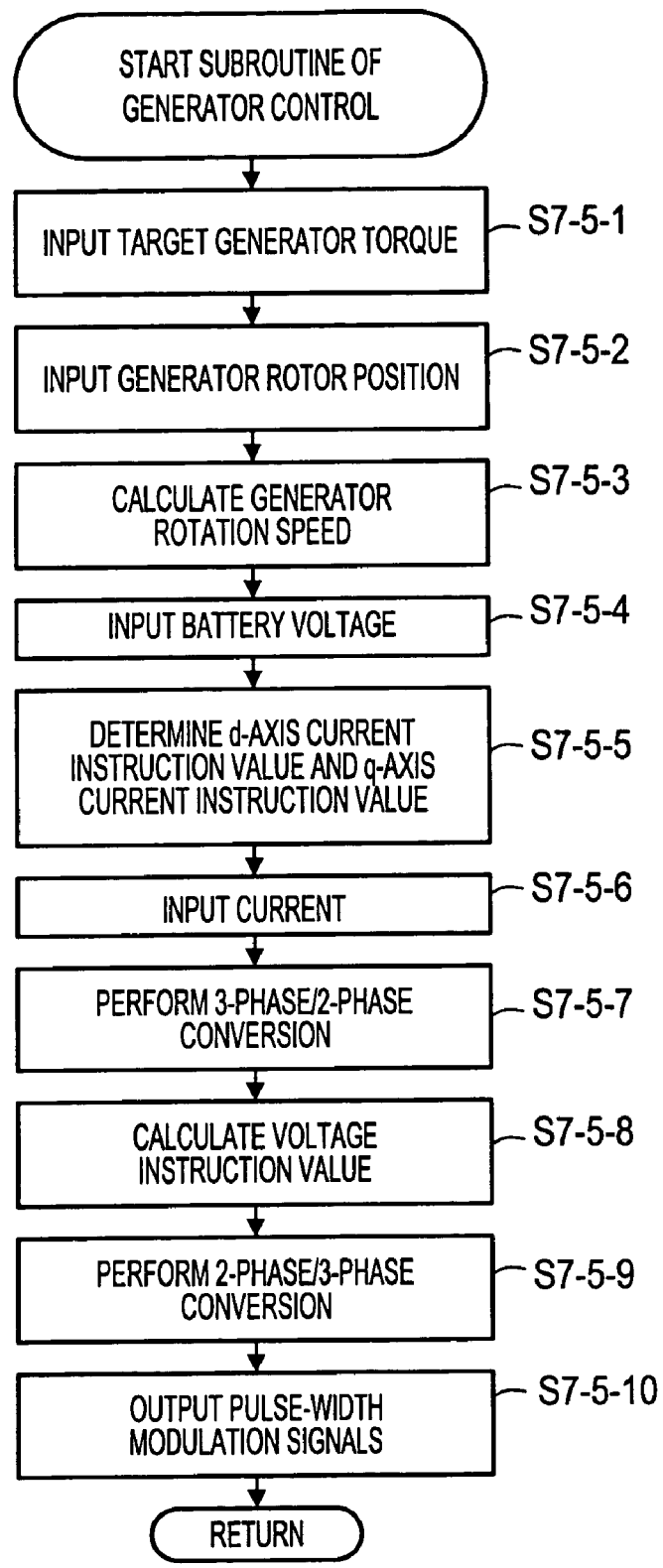
FIG. 17 is a flowchart illustrating a subroutine of a generator torque control process in accordance with an embodiment of the invention.

A subroutine of the generator torque control process of step S7-5 in FIG. 15 will next be described. FIG. 17 is a flowchart illustrating a subroutine of the generator torque control process in accordance with an embodiment of the invention. The generator torque control unit inputs the target generator torque TG*, and inputs the generator rotor position θG, and then calculates a generator rotation speed NG by calculating the rate of change ΔθG of the generator rotor position θG. Subsequently, the generator torque control inputs the battery voltage VB. Next, the generator torque control unit calculates and determines a d-axis current instruction value IGd* and a q-axis current instruction value IGq* on the basis of the target generator torque TG*, the generator rotation speed NG and the battery voltage VB with reference to a generator control-purposed current instruction value map recorded in a record device of the generator control device 47 (FIG. 7). Incidentally, the d-axis current instruction value IGd* and the q-axis current instruction value IGq* form alternating current instruction values for the generator 16.

The generator torque control unit inputs the currents IGU, IGV from the current sensors 66, 67, and calculates a current IGW from the currents IGU, IGV as follows:

$$IGW=IGU-IGV$$

The current IGW may also be detected by a current sensor as in the case of the currents IGU, IGV.

Subsequently, an alternating current calculation unit of the generator torque control unit performs an alternating current calculation process. That is, the alternating current calculation unit calculates a d-axis alternating current IGd and a q-axis alternating current IGq by converting the currents IGU, IGV, IGW into the d-axis current and the q-axis current through the three-phase/two-phase conversion. An AC voltage instruction value calculation unit of the generator torque control unit performs an AC voltage instruction value calculation process of calculating voltage instruction values VGd*, VGq* based on the d-axis current IGd and the q-axis current IGq, and the d-axis current instruction value IGd* and the q-axis current instruction value IGq*. Furthermore, the generator torque control unit converts the voltage instruction values VGd*, VGq* into voltage instruction values VGU*, VGV*, VGW* through the two-phase/three-phase conversion. The generator torque control unit then calculates pulse width modulation signals SU, SV, SW based on the voltage instruction values VGU*, VGV*, VGW*, and outputs the pulse width modulation signals SU, SV, SW to a drive process unit (not shown) of the generator control device 47. The drive process unit performs a drive process, and sends a drive signal SG1 to the inverter 28 on the basis of the pulse width modulation signals SU, SV, SW. Incidentally, the voltage instruction values VGd*, VGq* form AC voltage instruction values for the generator 16.

Next, the flowchart of FIG. 17 will be described. In step S7-5-1, the target generator torque TG* is input, in step S7-5-2, the generator rotor position θG is input, in step S7-5-3, the generator rotation speed NG is calculated, in S7-5-4, the battery voltage VB is input, in step S7-5-5, the d-axis current instruction value IGd* and the q-axis current instruction value IGq* are determined. In step S7-5-6, the currents IGU, IGV are input, in step S7-5-7, the three-phase/two-phase conversion is performed, in step S7-5-8, the voltage instruction values VGd*, VGq* are calculated, in step S7-5-9, the two-phase/three-phase conversion is performed, and in step S7-5-10, the pulse width modulation signals SU, SV, SW are output. Then, the process returns.

Figure 18:
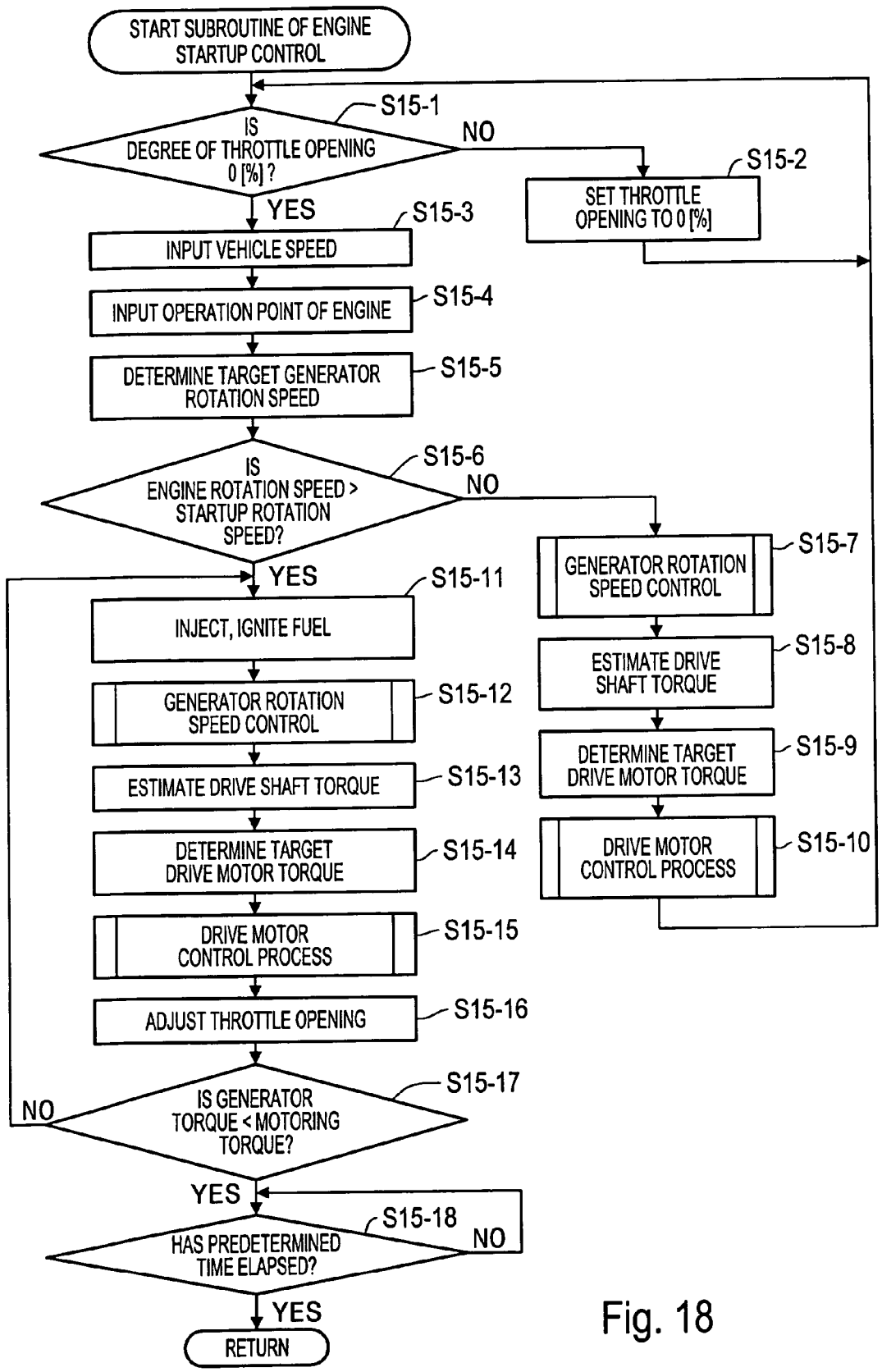
FIG. 18 is a flowchart illustrating a subroutine of an engine startup control process in accordance with an embodiment of the invention.

Next, a subroutine of the engine startup control process of step S15 in FIG. 9 will be described. FIG. 18 is a flowchart illustrating a subroutine of the engine startup control process in accordance with an embodiment of the invention. An engine startup control unit inputs the degree of throttle opening θ. If the degree of throttle opening θ is zero (0) [%], the engine startup control unit inputs the vehicle speed V calculated by the vehicle speed calculation unit, and inputs the point of operation of the engine 11 (FIG. 7) determined in the target engine operation state setting process.

Subsequently, the target generator rotation speed calculation unit performs the target generator rotation speed calculation process as described above. That is, the unit inputs the drive motor rotor position θM, and calculates a ring gear rotation speed NR on the basis of the drive motor rotor position θM and the gear ratio γR. Furthermore, the target generator rotation speed calculation unit inputs the target engine rotation speed NE* at the point of operation, and calculates and determines a target generator rotation speed NG* on the basis of the ring gear rotation speed NR and the target engine rotation speed NE*, as in the aforementioned rotation speed relational expression. The engine control device 46 compares the engine rotation speed NE with a pre-set startup rotation speed NEth1, and determines whether the engine rotation speed NE is higher than the startup rotation speed NEth1. If the engine rotation speed NE is higher than the startup rotation speed NEth1, the engine startup control unit performs the fuel injection and ignition in the engine 11.

The generator rotation speed control unit performs a generator rotation speed control process based on the target generator rotation speed NG*. Specifically, the generator rotation speed control unit increases the generator rotation speed NG, and correspondingly increases the engine rotation speed NE. Subsequently, the drive motor control device 49 estimates the drive shaft torque TR/OUT, and determines a target drive motor torque TM*, and performs the drive motor control process, as in steps S26 to S28.

The engine startup control unit adjusts the degree of throttle opening θ so that the engine rotation speed NE becomes equal to the target engine rotation speed NE*. Subsequently, in order to determine whether the engine 11 is normally driven, the engine startup control unit determines whether the generator torque TG is less than a motoring torque TEth associated with the startup of the engine 11, and waits for the elapse of a predetermined time, with the generator torque TE being less than the motoring torque TEth. If the engine rotation speed NE is less than or equal to the startup rotation speed NEth1, the generator rotation speed control unit performs the generator rotation speed control process based on the target generator rotation speed NG*. Subsequently, the drive motor control device 49 estimates the drive shaft torque TR/OUT, and determines a target drive motor torque TM*, and performs the drive motor control process, as in steps S26 to S28.

The flowchart of FIG. 18 will next be described. In step S15-1, a determination is made as to whether the degree of throttle opening θ is 0 [%]. If the degree of throttle opening θ is 0 [%], the process proceeds to step S15-3. If the degree of throttle opening θ is not 0 [%], the process proceeds to step S15-2, where the degree of throttle opening θ is adjusted to 0 [%]. Then, the process returns to step S15-1.

In step S15-3, the vehicle speed V is input, in step S15-4, the point of operation of the engine 11 is input, and in step S15-5, the target generator rotation speed NG* is determined. In step S15-6, a determination is made as to whether the engine rotation speed NE is higher than the startup rotation speed NEth1. If the engine rotation speed NE is higher than the startup rotation speed NEth1, the process proceeds to step S15-11. If the engine rotation speed NE is lower than or equal to the startup rotation speed NEth1, the process proceeds to step S15-7.

In step S15-7, the generator rotation speed control process is performed, in step S15-8, the drive shaft torque TR/OUT is estimated, in step S15-9, the target drive motor torque TM* is determined, and in step S15-10, the drive motor control process is performed. Then, the process returns to step S15-1. In step S15-11, the fuel injection and the fuel ignition are performed, in step S15-12, the generator rotation speed control process is performed, in step S15-13, the drive shaft torque TR/OUT is estimated, in step S15-14, the target drive motor torque TM* is determined, in step S15-15, the drive motor control process is performed, and in step S15-16, the degree of throttle opening θ is adjusted.

In step S15-17, a determination is made as to whether the generator torque TG is less than the motoring torque TEth. If the generator torque TG is less than the motoring torque TEth, the process proceeds to step S15-18 where an elapse of a predetermined time is awaited. If the predetermined amount of time has elapsed, the process returns. If the generator torque TG is greater than or equal to the motoring torque TEth, the process returns to Step S15-11.

Figure 19:
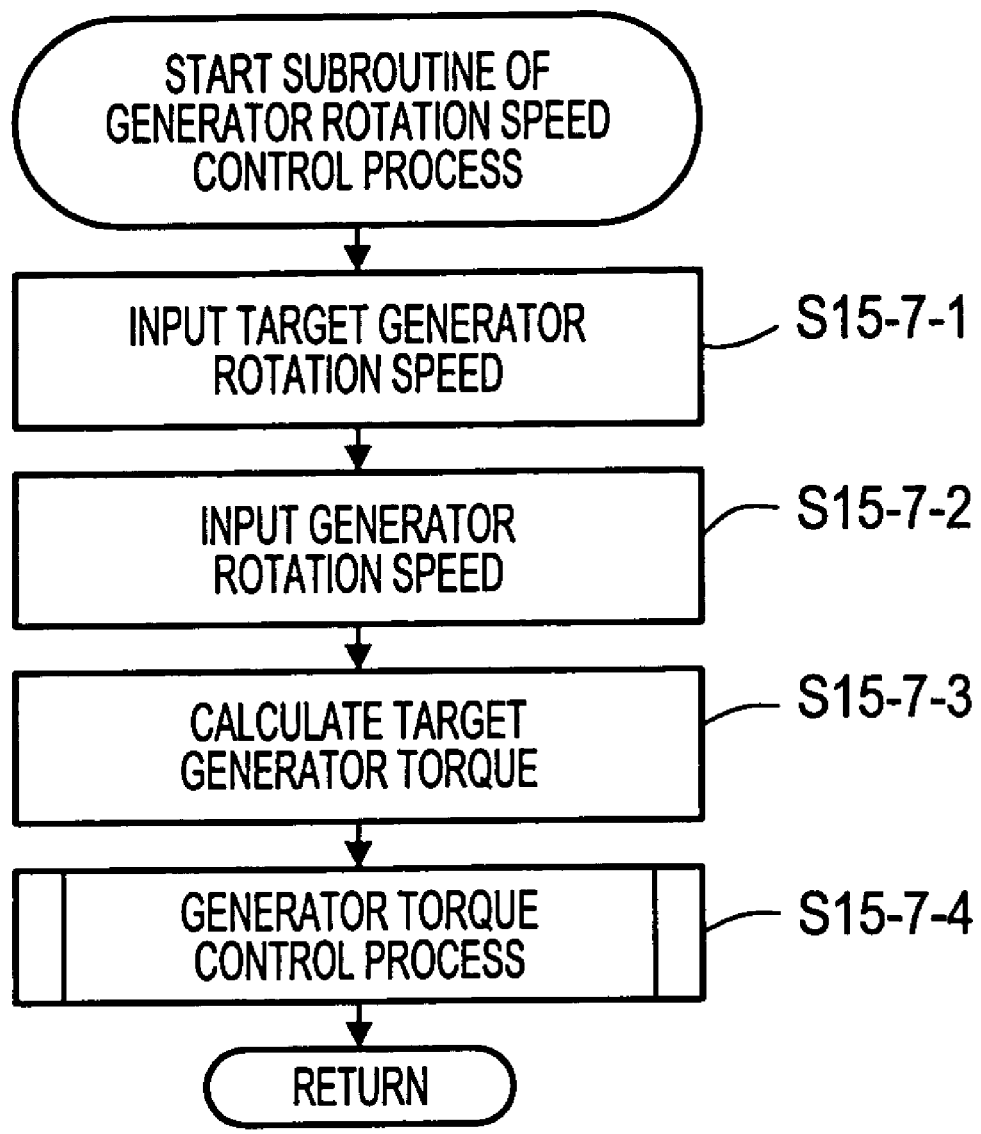
FIG. 19 is a flowchart illustrating a subroutine of a generator rotation speed control process in accordance with an embodiment of the invention.

Next, a subroutine of the generator rotation speed control process to step S24 in FIG. 10 and steps S15-7 and S15-12 in FIG. 18. FIG. 19 is a flowchart illustrating a subroutine of the generator rotation speed control process in accordance with an embodiment of the invention. First, the generator rotation speed control unit inputs the target generator rotation speed NG*, and inputs the generator rotation speed NG, and performs a PI control based on the rotation speed difference ΔNG between the target generator rotation speed NG* and the generator rotation speed NG, and calculates a target generator torque TG*. In this case, if the rotation speed difference ΔNG is greater, the target generator torque TG* is set greater, and the sign (positive/negative) of the value is taken into account. Subsequently, the generator torque control unit performs the generator torque control process illustrated in FIG. 17 to perform the torque control of the generator 16 (FIG. 7).

The flowchart of FIG. 19 will next be described. Steps S24, S15-7 and S15-12 are the same process, and step S15-7 will be described below. In step S15-7-1, the target generator rotation speed NG* is input, in step S15-7-2, the generator rotation speed NG is input, in step S15-7-3, the target generator torque TG* is calculated, and in step S15-7-4, the generator torque control process is performed. Then, the process returns.

Figure 20:
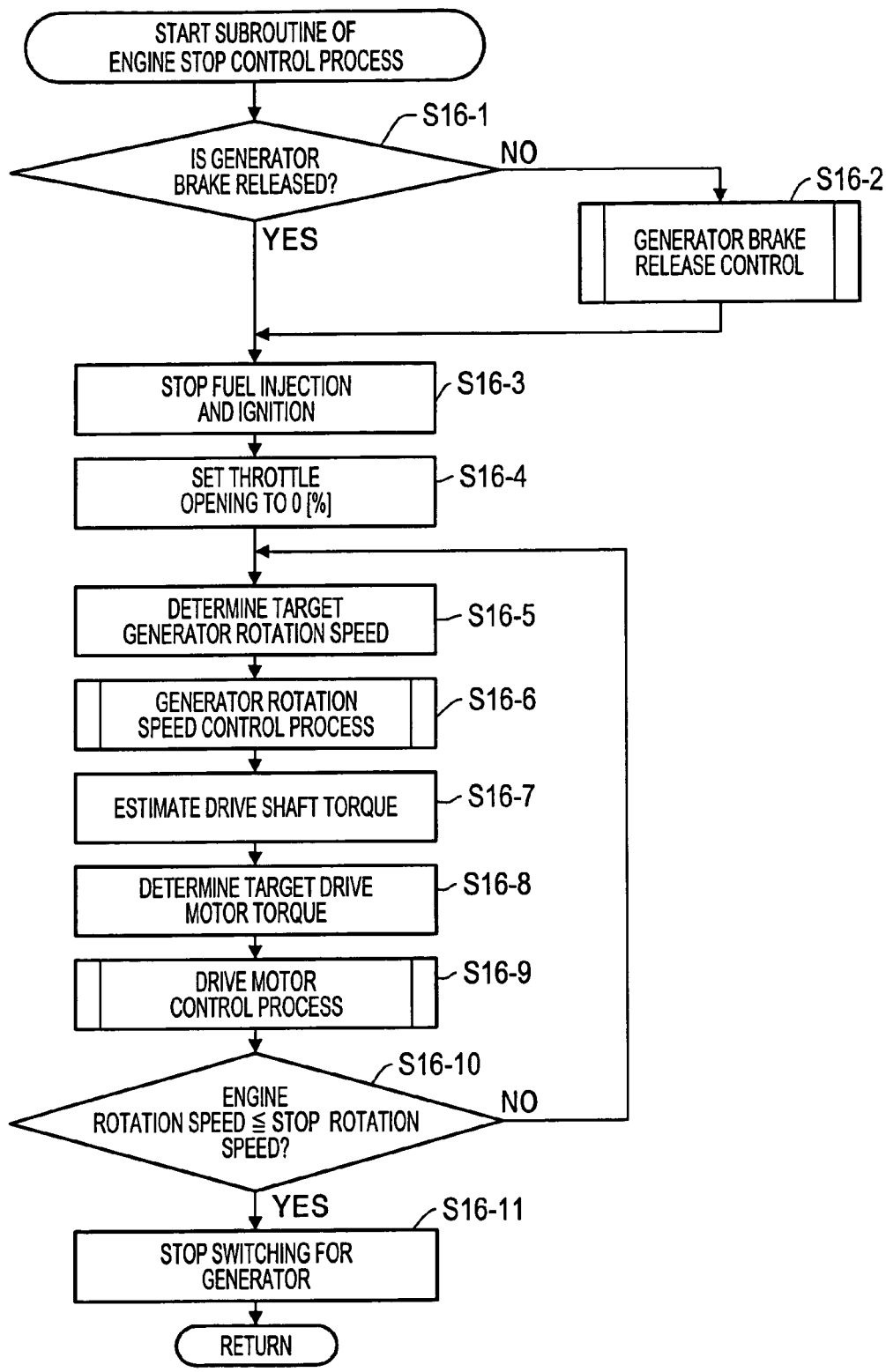
FIG. 20 is a flowchart illustrating a subroutine of an engine stop control process in accordance with an embodiment of the invention.

Next, a subroutine of the engine stop control process of step S16 in FIG. 19 will be described. FIG. 20 is a flowchart illustrating a subroutine of the engine stop control process in accordance with an embodiment of the invention. First, the generator control device 47 (FIG. 7) determines whether the generator brake B is in the released state. If the generator brake B is not in the released state but in the engaged state, the generator brake release control unit performs a generator brake release control to release the generator brake B. If the generator brake B is in the released state, the engine stop control unit stops the fuel injection and the fuel ignition in the engine 11, and sets the degree of throttle opening θ at 0 [%].

Subsequently, the engine stop control unit inputs the ring gear rotation speed NR, and determines a target generator rotation speed NG* on the basis of the ring gear rotation speed NR and the target engine rotation speed NE* (0 [rpm]) as in the rotation speed relational expression. Then, after the generator control device 47 performs the generator rotation speed control process illustrated in FIG. 19, the drive motor control device 49 estimates the drive shaft torque TR/OUT, and determines a target drive motor torque TM*, and performs the drive motor control process, as in steps S26 to S28. Next, the generator control device 47 determines whether the engine rotation speed NE is lower than or equal to a stop rotation speed NEth2. If the engine rotation speed NE is lower than or equal to the stop rotation speed NEth2, the generator control device 47 stops the switching with respect to the generator 16, and shuts down the generator 16.

The flowchart of FIG. 20 will next be described. In step S16-1, a determination is made as to whether the generator brake B is in the released state. If the generator brake B is in the released state, the process proceeds to step S16-3. If the generator brake B is not in the released state, the process proceeds to step S16-2, where the generator brake release control process is performed. In step S16-3, the fuel injection and the fuel ignition are stopped, in step S16-4, the degree of throttle opening θ is set at 0 [%], and in step S16-5, the target generator rotation speed NG* is determined.

In step S16-6, the generator rotation speed control process is performed, in step S16-7, the drive shaft torque TR/OUT is estimated, in step S16-8, the target drive motor torque TM* is determined and in step S16-9, the drive motor control process is performed. In step S16-10, a determination is made as to whether the engine rotation speed NE is lower than or equal to the stop engine rotation speed NEth2. If the engine rotation speed NE is lower than or equal to the stop engine rotation speed NEth2, the process proceeds to step S16-11 where the switching with respect to the generator 16 is stopped. Then, the process returns. If the engine rotation speed NE is higher than the stop engine rotation speed NEth2, the process returns to step S16-5.

Figure 21:
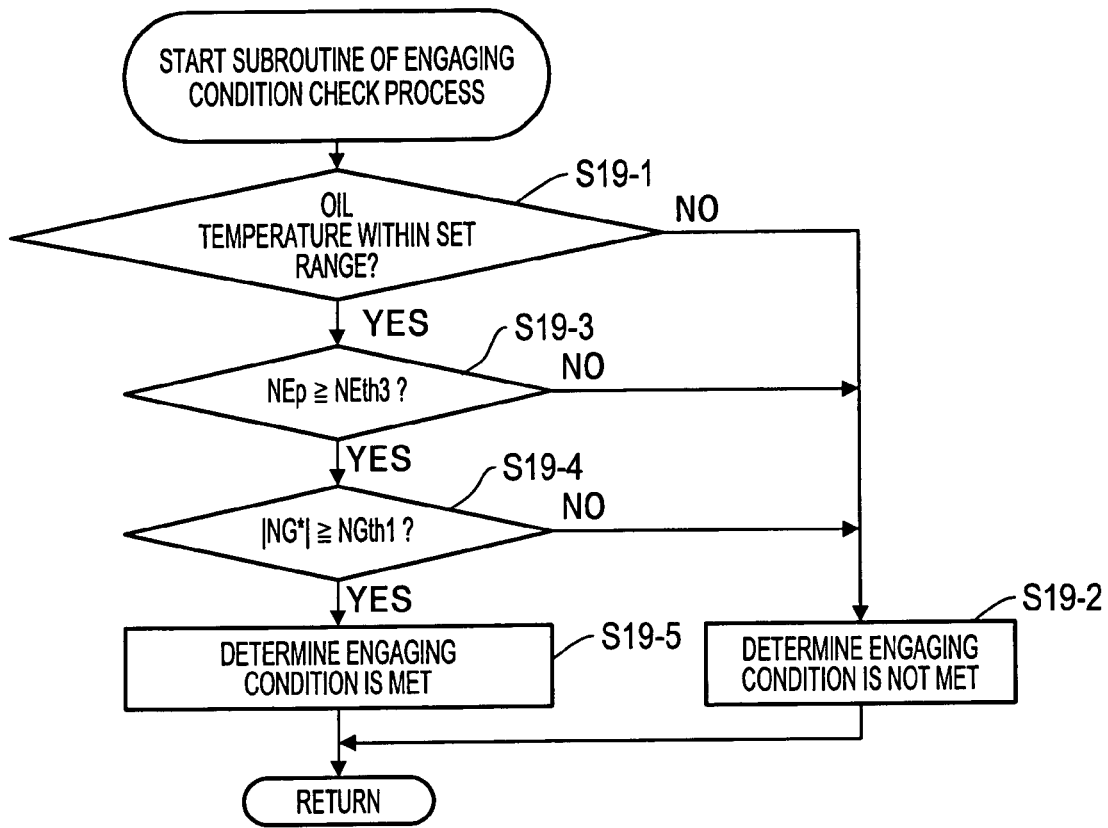
FIG. 21 is a flowchart illustrating a subroutine of an engaging condition check process in accordance with an embodiment of the invention.

A subroutine of the engaging condition check process of step S19 in FIG. 10 will next be described. FIG. 21 is a flowchart illustrating a subroutine of the engaging condition check process in accordance with an embodiment of the invention. First, the engaging condition check unit inputs the ring gear rotation speed NR, the oil temperature tmB, and the target generator rotation speed NG*. On the basis of the ring gear rotation speed NR, the engaging condition check unit calculates an engine rotation speed NE that occurs when the generator rotation speed NG is brought to zero (0) by engaging the generator brake B (hereinafter, referred to as "parallel engine rotation speed NEp"). Instead of the ring gear rotation speed NR, the vehicle speed may be input and used to calculate the parallel engine rotation speed NEp.

Subsequently, the engaging condition check unit inputs the engine rotation speed NE and the generator rotation speed NG, and determines whether a first condition is met on the basis of whether the oil temperature tmB is within a set range (e.g., the range of 20 to 150[° C.]). The engaging condition check unit also determines whether a second condition is met on the basis of whether the parallel engine rotation speed NEp is higher than or equal to a threshold value NEth3 (e.g., 1300 [rpm]). The engaging condition check unit determines whether a third condition is met on the basis of whether the absolute value of the target generator rotation speed NG* is less than a first rotation speed NGth1 (e.g., 100 [rpm]).

The engaging condition check unit determines that the engaging condition is met provided that the oil temperature tmB is within the set range, and that the parallel engine rotation speed NEp is higher than or equal to the threshold value NEth3, and that the absolute value of the target generator rotation speed NG* is less than the first rotation speed NGth1, and that the first to third conditions are fulfilled. The engaging condition check unit determines that the engaging condition is not met, if the oil temperature tmB is not within the set range, or if the parallel engine rotation speed NEp is lower than the threshold value NEth3, or if the absolute value of the target generator rotation speed NG* is higher than or equal to the first rotation speed NGth1 and at least one of the first to third conditions is unfulfilled.

Thus, although the target generator torque TG* is relatively low and therefore the generator rotation speed NG is relatively low, the engaging condition is not met and therefore the generator brake B is not engaged if the oil temperature tmB is not within the set range, or if the parallel engine rotation speed NEp is lower than the threshold value NEth3. Therefore, even if the viscosity of oil changes as the oil temperature tmB changes, the generator brake B can be engaged in an optimal state, so that the stalling of the engine 11 can be prevented.

The stalling of the engine 11 can be more reliably prevented by changing the threshold value NEth3 and the first rotation speed NGth1 depending on the oil temperature tmB so that the threshold value NEth3 is increased to lower the oil temperatures tmB, and so that the first rotation speed NGth1 is decreased to lower oil temperatures tmB.

The flowchart of FIG. 21 will be described. In Step S19-1, a determination is made as to whether the oil temperature tmB is within a set range. If the oil temperature tmB is within the set range, the process proceeds to step S19-3. If the oil temperature tmB is not within the set rage, the process proceeds to step S19-2, where it is determined that the engaging condition is not fulfilled. Then, the process returns.

In step S19-3, a determination is made as to whether the parallel engine rotation speed NEp is higher than or equal to the threshold value NEth3. If the parallel engine rotation speed NEp is greater than or equal to the threshold value NEth3, the process proceeds to step S19-4. If the parallel engine rotation speed NEp is less than the threshold value NEth3, the process proceeds to step S19-2.

In step S19-4, a determination is made as to whether the absolute value of the target generator rotation speed NG* is greater than the first rotation speed NGth1. If the absolute value of the target generator rotation speed NG* is less than the first rotation speed NGth1, the process proceeds to step S19-5 where it is determined that the engaging condition is fulfilled. Then, the process returns. If the absolute value of the target generator rotation speed NG* is less than or equal to the first rotation speed NGth1, the process proceeds to step S19-2.

Figure 22:
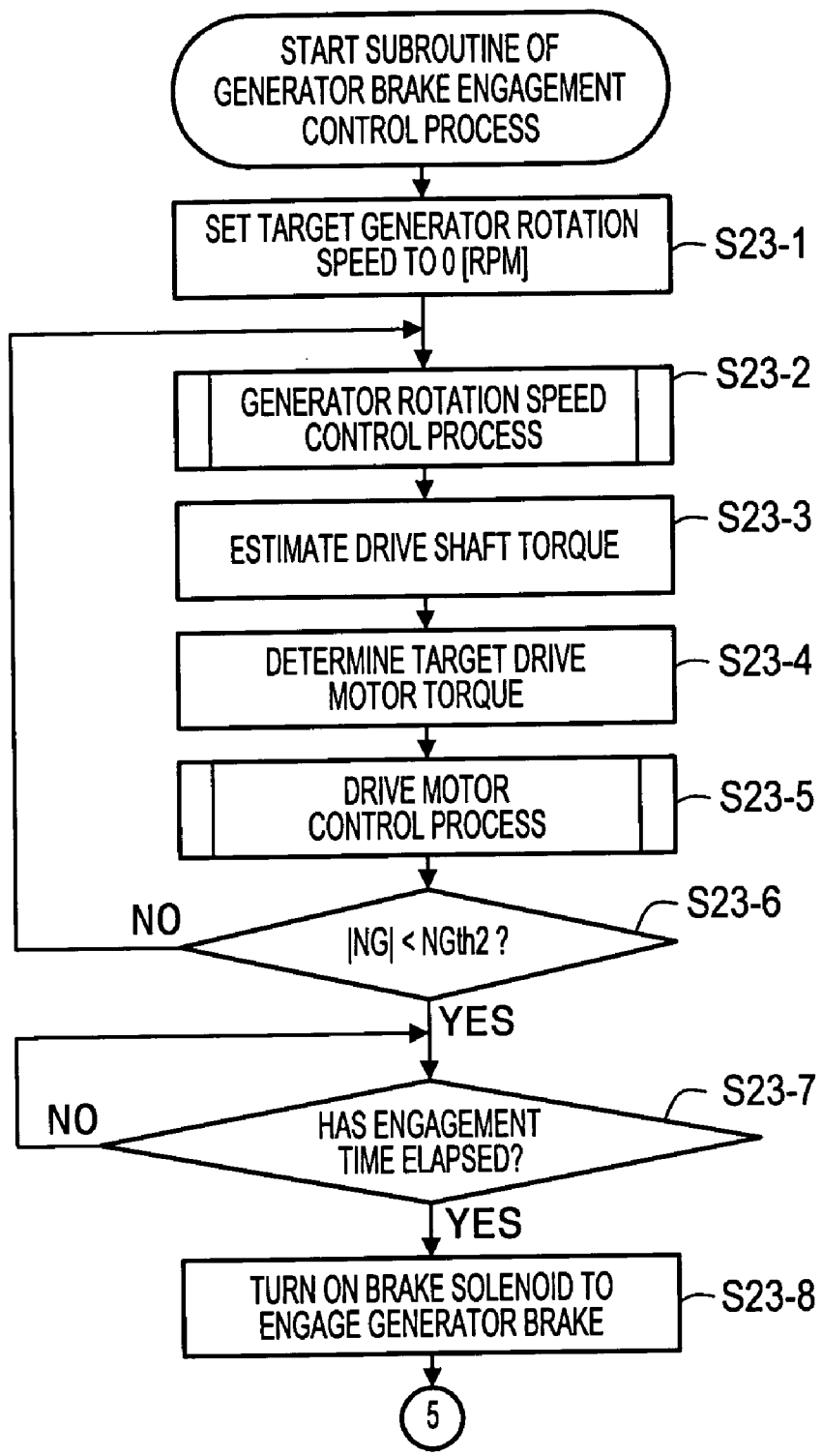
FIG. 22 is the first flowchart illustrating a subroutine of a generator brake engagement control process in accordance with an embodiment of the invention.
Figure 23:
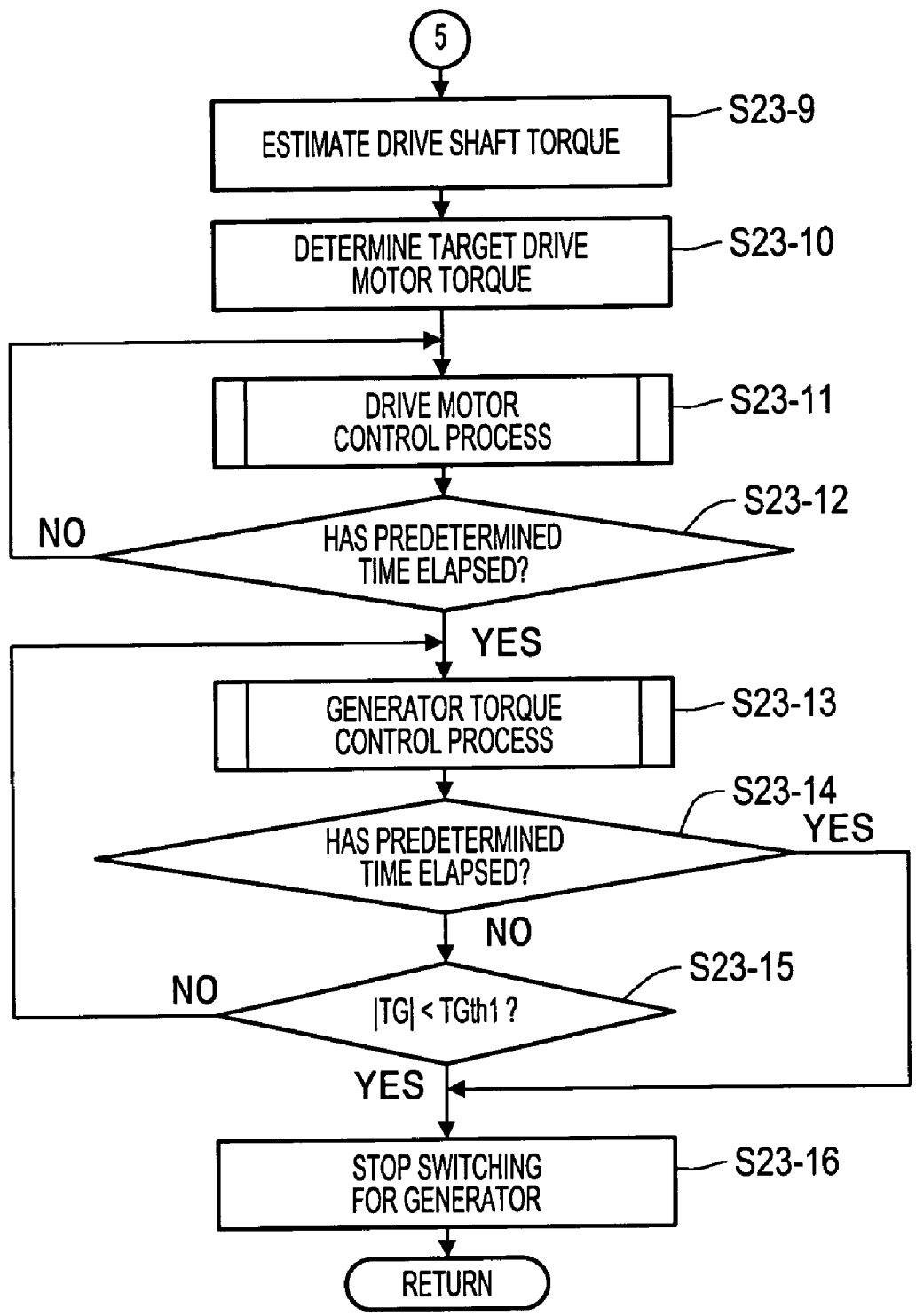
FIG. 23 is the second flowchart illustrating the subroutine of the generator brake engagement control process in accordance with the embodiment.
Figure 24:
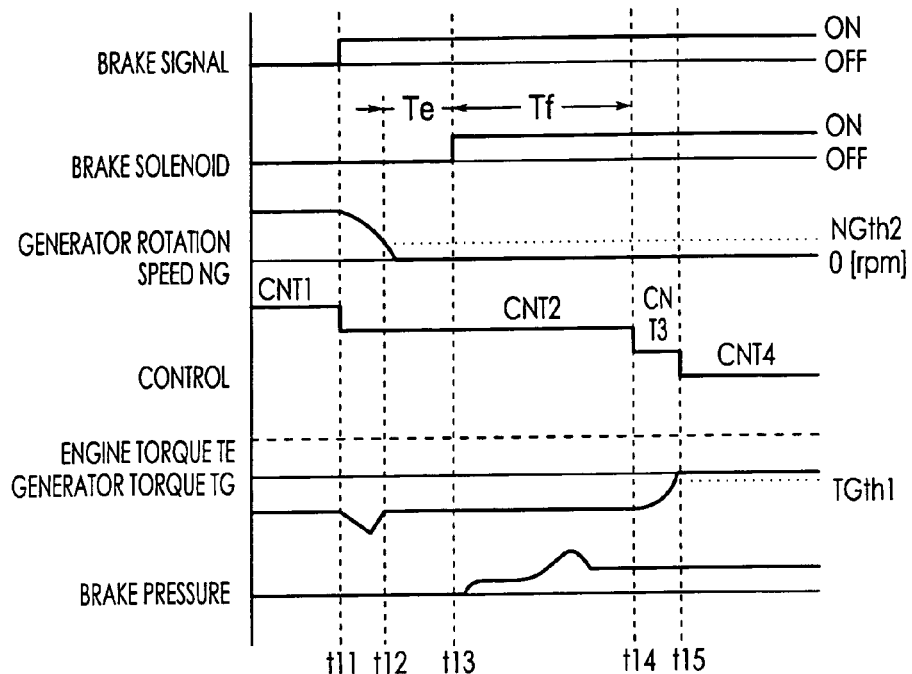
FIG. 24 is a time chart illustrating an operation of the generator brake engagement control process in accordance with an embodiment of the invention.
Figure 25:
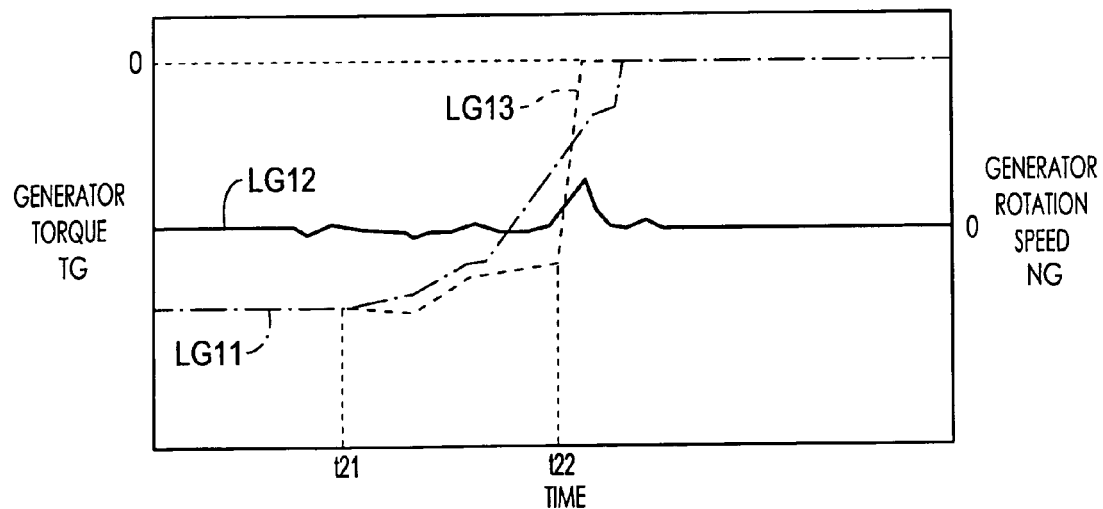
FIG. 25 is a time chart of the generator torque and the generator rotation speed in accordance with an embodiment of the invention.

Next, a subroutine of the generator brake engagement control process of step S23 in FIG. 10 will be described. FIG. 22 is the first flowchart illustrating a subroutine of the generator brake engagement control process in accordance with an embodiment of the invention. FIG. 23 is the second flowchart illustrating the subroutine of the generator brake engagement control process. FIG. 24 is a time chart indicating an operation of the generator brake engagement control process in accordance with the embodiment of the invention. FIG. 25 is a time chart indicating the generator torque and the generator rotation speed in the embodiment of the invention.

If the engaging condition is met and the brake signal turns on at a timing t11 during execution of the rotation speed control (CNT1) of the generator 16 (FIG. 7), the generator brake engagement control unit 91 (FIG. 1) sets the target generator rotation speed NG* at zero (0) [rpm], and starts the rotation speed control (CNT2) of the generator 16 in accordance with the generator rotation speed control process illustrated in FIG. 19. Subsequently, the drive motor control device 49 estimates the drive shaft torque TR/OUT, and determines a target drive motor torque TM*, and executes the drive motor control process. During this process, the generator torque TG temporarily decreases, and then increases.

Next, the generator brake engagement control unit 91 determines whether the absolute value of the generator rotation speed NG is less than a predetermined second rotation speed NGth2 (e.g., 100 [rpm]). If the absolute value of the generator rotation speed NG is less than the second rotation speed NGth2 at a timing t12, the unit 91 waits for the elapse of an engagement time Te. At the elapse of the engagement time Te, that is, at a timing t13, an engagement unit (not shown) of the generator brake engagement control unit 91 executes an engagement process of turning on a brake solenoid to engage the generator brake B and therefore mechanically stop rotation of the generator 16.

If the generator brake B is engaged, the pressure on the hydraulic servo of the generator brake B, that is the brake pressure, is gradually increased. Subsequently, the drive motor control device 49 estimates the drive shaft torque TR/OUT, and determines a target drive motor torque TM*, and executes the drive motor control process, as in steps S26 to S28.

After the generator brake B is completely engaged, the generator brake engagement control unit 91 starts a torque reduction control (CNT3) in accordance with the generator torque control process of FIG. 17 at a timing t14. That is, at the elapse of a predetermined time Tf following the turning on of the brake solenoid. In the torque reduction control, the unit 91 gradually decreases the generator torque TG over a predetermined amount of time.

In this embodiment, during the period of the timing t11 to the timing t15, the target generator rotation speed NG* is set at zero [rpm], and the rotation speed control of the generator 16 by the PI control is performed. As such, as the generator rotation speed NG approaches zero [rpm], the proportional component (P component) decreases. Also when the generator rotation speed NG reaches zero and the proportional component becomes zero, only the integral component (I component) remains. Subsequently, at the timing t14, the integral component is gradually decreased by a predetermined function, so that the generator torque TG is gradually decreased. As for the function, a linear function may be used so that the integral component will be linearly decreased, or a step function may be used so that the integral component will be decreased stepwise.

Therefore, the generator brake control unit 91 executes a function operation to calculate the value of the integral component for every control cycle. In another possible construction, an integral component whose parameter in time is recorded as a table in the ROM, and when the integral component is gradually decreased, the table is referred to during every control cycle to read a value of the integral component.

In order to gradually decrease the generator torque TG, the torque control of the generator 16 may be executed instead of the rotation speed control of the generator 16. In this case, the target generator torque TG* is gradually decreased in accordance with a predetermined function. If the absolute value of the generator torque TG becomes less than a threshold value TGth1, the generator brake engagement control unit 91 starts the shut-down control (CNT4) at a timing t15. That is, the unit 91 stops the switching with respect to the generator 16 to stop (shut down) the generator 16. The shut-down control is also started when a time Tg elapses following the beginning of the torque reduction control.

In FIG. 25, LG11 and LG13 denote lines indicating the generator torque TG, and LG12 denotes a line indicating the generator rotation speed NG. At a timing t21, the rotation speed control is started, and the target generator rotation speed is set at zero. Then, after the generator brake B is engaged, the generator torque TG is gradually changed to zero as indicated by the line LG11. Therefore, the timing of the generator brake B bearing or receiving an engine torque TE can be delayed. This arrangement considerably prevents the generator rotation speed NG from becoming high before the backlashes of component parts of the generator brake B, such as thin plates and the like, are filled in or eliminated. Therefore, occurrence of an abnormal noise, such as rattling noise or the like, and breakage or damage of an end plate of the stator 22 (FIG. 3) can be prevented. Thus, the service life of the generator brake B can be increased.

In another possible arrangement, the rotation speed control is started at the timing t21, and the target generator rotation speed is set at zero. After the generator brake is engaged, the generator torque TG is gradually decreased as indicated by the line LG13. Then, when the backlashes of component parts of the generator brake B, such as thin plates and the like, are filled in or eliminated, the generator torque TG is rapidly changed to zero at the timing t22. This arrangement also considerably prevents the generator rotation speed NG from rising high before the backlashes of component parts of the generator brake B, such as thin plates and the like, are filled in or eliminated.

The flowchart illustrated in FIG. 22 will be described. In step S23-1, the target generator rotation speed NG* is set at zero [rpm], in step S23-2, the generator rotation speed control is executed, in step S23-3, the drive shaft torque TR/OUT is estimated, in step S23-4, the target drive motor torque TM* is determined, and in S23-5, the drive motor control is executed.

In step S23-6, a determination is made as to whether the absolute value of the generator rotation speed NG is less than the second rotation speed NGth2. If the absolute value of the generator rotation speed NG is less than the second rotation speed NGth2, the process proceeds to step S23-7 where the elapse of the engagement time Te is awaited. Upon the elapse of the engagement time Te, the process proceeds to step S23-8. If the absolute value of the generator rotation speed NG is greater than or equal to the second rotation speed NGth2, the process returns step S23-2.

In step S23-8, the brake solenoid is turned on to engage the generator brake B, in step S23-9, the drive shaft torque TR/OUT is estimated, in step S23-10, the target drive motor torque TM* is determined, and in step S23-11, the drive motor control process is executed. In step S23-12, a determination is made as to whether the predetermined time Tf has elapsed. If the time Tf has elapsed, the process proceeds to step S23-13 where the generator torque control process is executed. If the time Tf has not elapsed, the process returns to step S23-11.

In step S23-14, a determination is made as to whether the time Tg has elapsed. If the time Tg has elapsed, the process proceeds to step S23-16. If the time Tg has not elapsed, the process proceeds to step S23-15. In step S23-15, a determination is made as to whether the absolute value of the generator torque TG is less than the threshold value TGth1. If the absolute value of the generator torque TG is less than the threshold value TGth1, the process proceeds to step S23-16. If the absolute value of the generator torque TG is greater than or equal to the threshold value TGth1, the process returns step S23-13. In step S23-16, the switching with respect to the generator 16 is stopped. Then, the process returns.

Figure 26:
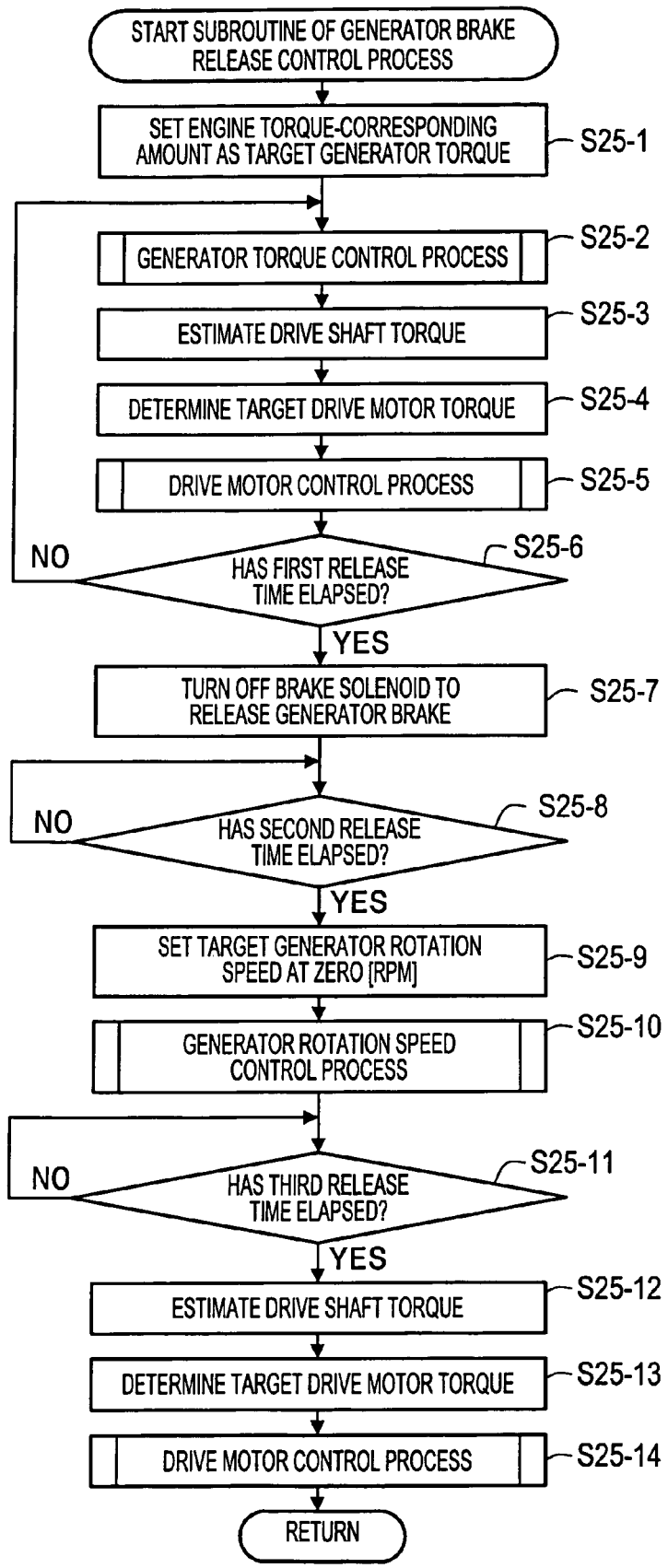
FIG. 26 is a flowchart illustrating a subroutine of a generator brake release control process in accordance with an embodiment of the invention.

A subroutine of the generator brake release control process of step S25 in FIG. 10 and of step S16-2 in FIG. 20 will be described. FIG. 26 is a flowchart illustrating a subroutine of the generator brake release control process in accordance with an embodiment of the invention. While the generator brake B (FIG. 7) is engaged in the generator brake release control process, a predetermined engine torque TE acts as a reaction force on the rotor 21 of the generator 16. Therefore, if the generator brake B is simply released, the generator torque TG and the engine torque TE greatly change and therefore cause a shock as the engine torque TE is transferred to the rotor 21.

Hence, in the engine control device 46, the engine torque TE transferred to the rotor 21 is estimated or calculated. The generator brake release control unit inputs a torque corresponding to the estimated or calculated engine torque TE, that is, the engine torque-corresponding amount, and sets the engine torque-corresponding amount as a target generator torque TG*. Then, after the generator torque control unit executes the generator torque control process illustrated in FIG. 17, the drive motor control device 49 estimates the drive shaft torque TR/OUT, and determines a target drive motor torque TM*, and executes the drive motor control process, as in steps S26 to S28.

At the elapse of a first release time following the beginning of the generator torque control process, a release unit of the generator brake release control unit executes a release process. That is, the release unit turns off the brake solenoid to release the generator brake B. At the elapse of a second release time, the target generator rotation speed NG* is set at zero [rpm], and then the generator rotation speed control unit executes the generator rotation speed control process illustrated in FIG. 19. Then, at the elapse of a third release time, the drive motor control device 49 estimates the drive shaft torque TR/OUT, and determines a target drive motor torque TM*, and executes the drive motor control process, as in steps S26 to S28. The engine torque-corresponding amount is estimated or calculated by learning the torque ratio of the generator torque TG to the engine torque TE.

Next, the flowchart will be described. Steps S16-2 and S25 are the same process, and step S25 will be described below. In step S25-1, The engine torque-corresponding amount is set as a target generator torque TG*, in step S25-2, the generator torque control process is executed, in step S25-3, the drive shaft torque TR/OUT is estimated, in step S25-4, the target drive motor torque TM* is determined, and in step S25-5, the drive motor control process is executed. In step S25-6, a determination is made as to whether the first release time has elapsed. If the first release time has elapsed, the process proceeds to step S25-7. If the first release time has not elapsed, the process returns step S25-2.

In step S25-7, the brake solenoid is turned off to release the generator brake B, and in step S25-8, the elapse of the second release time is awaited. When the second release time has elapsed, the process proceeds to step S25-9. In step S25-9, the target generator rotation speed NG* is set at zero [rpm], and in step S25-10, the generator rotation speed control process is executed. In step S25-11, a determination is made as to whether the third release time has elapsed. If the third release time has elapsed, the process proceeds to step S25-12. If the third release time has not elapsed, the process returns step S25-10. In step S25-12, the drive shaft torque TR/OUT is estimated, in step S25-13, the target drive motor torque TM* is determined, and in step S25-14, the drive motor control process is executed. Then, the process returns.

It is to be understood that the invention is not limited to the foregoing embodiments or constructions, but may also be carried out with various other modifications based on the sprit of the invention. That is, the invention is intended to cover such various modifications and equivalent arrangements.

What is claimed is:

1. A hybrid vehicle drive control apparatus, comprising:
an electric generator mechanically connected to an engine so as to have a differential rotation with respect to the engine;
a generator brake for mechanically stopping a rotation of the generator; and
a controller that gradually decreases a generator torque while engaging the generator brake, wherein upon a generator brake engagement request, the controller sets a target generator rotation speed at zero and performs a rotation speed control of the generator.

2. The hybrid vehicle drive control apparatus according to claim 1, wherein the controller gradually decreases the generator torque after an elapse of a predetermined time following engagement of the generator brake.

3. The hybrid vehicle drive control apparatus according to claim 1, wherein the controller gradually decreases the generator torque by performing a rotation speed control of the generator.

4. The hybrid vehicle drive control apparatus according to claim 1, wherein the controller gradually decreases the generator torque by gradually decreasing an integral component that occurs after a proportional component reaches.

5. The hybrid vehicle drive control apparatus according to claim 1, wherein the controller gradually decreases the generator torque by performing a torque control of the generator.

* * * * *